US012792294B2

(12) United States Patent
Heinzmann et al.

(10) Patent No.: US 12,792,294 B2
(45) Date of Patent: Nov. 10, 2026

(54) AUDIO DETECTION AND MIXING

(71) Applicant: Comcast Cable Communications, LLC, Philadelphia, PA (US)

(72) Inventors: Julianne Heinzmann, Philadelphia, PA (US); Resmi Vijayan, Philadelphia, PA (US); Andrew Posmontier, Philadelphia, PA (US); Brandon Gorski, Philadelphia, PA (US); Casey Guarasci, Orlando, FL (US); Brandon Burnette, Philadelphia, PA (US); Jackson Harding, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 123 days.

(21) Appl. No.: 18/419,983

(22) Filed: Jan. 23, 2024

(65) Prior Publication Data

US 2025/0238190 A1 Jul. 24, 2025

(51) Int. Cl.

| | |
|---|---|
| ***G06F 3/16*** | (2006.01) |
| ***H04R 3/04*** | (2006.01) |
| ***H04R 3/12*** | (2006.01) |
| ***H04R 5/02*** | (2006.01) |

(52) U.S. Cl.

CPC .............. *G06F 3/165* (2013.01); *G06F 3/167* (2013.01); *H04R 3/04* (2013.01); *H04R 3/12* (2013.01); *H04R 5/02* (2013.01); *H04R 2499/11* (2013.01); *H04R 2499/15* (2013.01)

(58) Field of Classification Search

CPC ........... G06F 3/165; G06F 3/167; H04R 3/04; H04R 3/12; H04R 5/02; H04R 2499/11; H04R 2499/15; H04S 7/301; H04S 7/303

See application file for complete search history.

(56) References Cited

U.S. PATENT DOCUMENTS

| | | | | |
|---|---|---|---|---|
| 9,288,597 | B2 | 3/2016 | Carlsson et al. | |
| 10,827,269 | B1 | 11/2020 | Sim et al. | |
| 2016/0212534 | A1* | 7/2016 | Le Nerriec | H04R 3/12 |
| 2017/0127145 | A1* | 5/2017 | Rajapakse | H04R 29/006 |
| 2017/0300289 | A1* | 10/2017 | Gattis | G10L 19/018 |
| 2019/0110125 | A1* | 4/2019 | Ramalingam | H04R 1/26 |
| 2019/0200133 | A1* | 6/2019 | Hammer | H04W 12/50 |
| 2020/0389754 | A1* | 12/2020 | Prasso | G06T 7/74 |
| 2020/0389756 | A1* | 12/2020 | Robinson | H04S 7/303 |
| 2021/0204003 | A1* | 7/2021 | Nicol | G10H 1/00 |
| 2021/0258712 | A1* | 8/2021 | Lyren | H04R 5/033 |
| 2022/0303707 | A1* | 9/2022 | Jung | H04S 7/301 |
| 2022/0321075 | A1* | 10/2022 | Friant | H04R 5/04 |
| 2023/0328471 | A1* | 10/2023 | Singh | H04S 7/302<br>381/303 |

FOREIGN PATENT DOCUMENTS

| | | | |
|---|---|---|---|
| WO | 2016037155 | A1 | 3/2016 |

* cited by examiner

*Primary Examiner* — Yogeshkumar Patel

(74) *Attorney, Agent, or Firm* — Banner & Witcoff, Ltd.

(57) ABSTRACT

Systems, apparatuses, and methods for mixing audio content are described. The audio capabilities of detected audio output devices may be determined and used to generate mixed audio for content received by the audio output devices. The dimensions of a space including the audio output devices may be used to determine an audio configuration for the audio output devices. Furthermore, changes to the audio output devices may be used to change the mixed audio.

54 Claims, 11 Drawing Sheets

AUDIO DETECTION AND MIXING

BACKGROUND

The audio portion of media content (e.g., movie or television content) may be outputted to a variety of speakers. Further, the audio portion of the media content may include different channels that may be used to produce various sound effects to enhance the viewing experience. For example, in addition to stereo channels, the audio portion of media content may comprise front, center, and rear audio channels that may be used to produce a surround sound effect that may make audio seem more realistic. Additionally, audio for a dialogue between two actors may include a first audio channel for the first actor that is outputted by a speaker on one side of a room and a second audio channel for the second actor that is outputted by a speaker on a different side of the room from the first speaker. However, the audio equipment used by different users may vary and a surround system that is based on a fixed audio device configuration may not meet the needs of individual users.

SUMMARY

The following summary presents a simplified summary of certain features. The summary is not an extensive overview and is not intended to identify key or critical elements.

Systems, apparatuses, and methods are described for an audio mixing system that may generate audio data (e.g., mixed audio data) based on the detection of audio output devices (e.g., smartphones, televisions, loudspeakers, and/or laptop computers), determination of the dimensions of a space including the audio output devices, and/or determination of estimated locations of viewers of content. The disclosed technology allows for the automated mixing of audio content using devices including but not limited to the device through which the audio content is received. Further, the audio mixing system may enhance the audio experience by automatically changing an audio mix based on the detection of changes to the audio output devices (e.g., changes to the number and/or type of audio output devices).

The audio mixing system may comprise a computing device (e.g., a smartphone) that is configured to receive data indicating audio content. The audio mixing system may determine audio capabilities of audio output devices in the vicinity of the computing device (e.g., within the same room or within a threshold distance of the computing device). Further, the audio mixing system may determine dimensions of a space (e.g., a room) that includes the audio output devices, the locations of the audio output devices within the space, and/or estimated locations of viewers within the space. The audio mixing system may then use the audio capabilities of the audio output devices, the dimensions of the space, locations of the audio output devices, and/or the estimated locations of viewers, to generate mixed audio that may enhance the quality of the audio that is outputted. For example, the audio mixing system may detect three smartphones that are in the same room as a television that is being used to output an audio-video stream (e.g., a movie) that includes audio content that is outputted via the televisions speakers.

The audio mixing system may also mix the audio so that some audio channels of the audio content are outputted via the smartphones in addition to the television. Further, the audio may be mixed so that different audio channels may be outputted the different audio output devices. For example, if television is located in the front portion of the room and the smart phones are located in the left, right, and rear portions of the room in front of the television, the audio may be mixed so that the center channel audio is outputted via the television, the left channel audio is outputted via the smartphone on the left, the right channel audio may be outputted via the smartphone on the right, and the rear audio channel may be outputted via the smartphone at the rear of the room. The disclosed technology may provide a more effective way to generate an improved surround sound effect that may surpass limitations of the output device that receives data indicating audio content. Further, the disclosed technology may allow for greater customization of sound based on the availability of audio output devices at the time the content is consumed.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
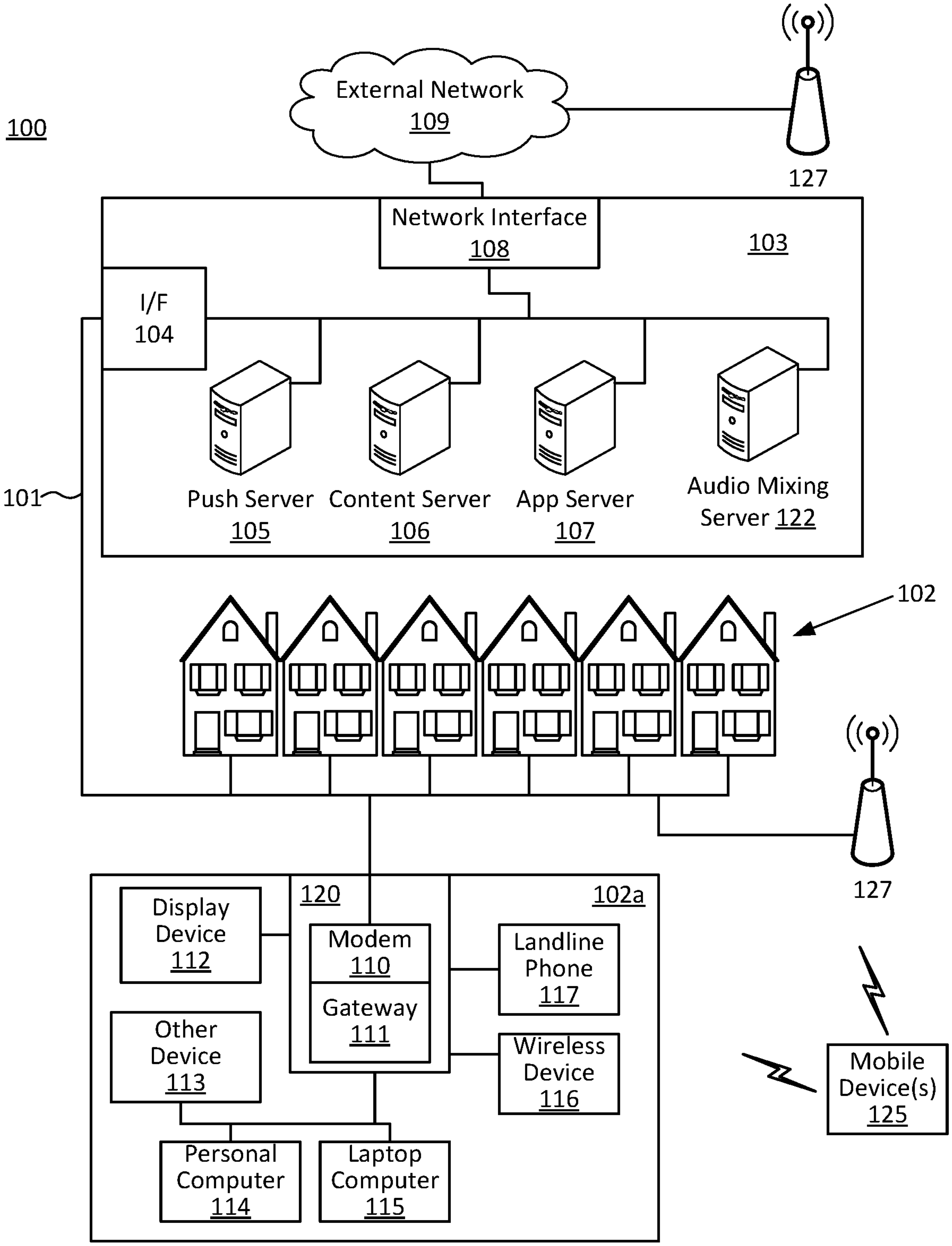
FIG. 1 shows an example communication network.

The accompanying drawings, which form a part hereof, show examples of the disclosure. It is to be understood that the examples shown in the drawings and/or described herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The one or more mobile devices 125 may comprise one or more smart phones, one or more tablet computing devices, or one or more laptop computers with one or more wireless transceivers, one or more tablet computing devices, or one or more laptop computers communicatively coupled to other devices with one or more wireless transceivers, and/or any other type of device configured to communicate via a wireless network. For example, the one or more mobile devices 125 may comprise a smartphone that is used to view content (e.g., an audio-video stream that comprises data indicating audio content) that is transmitted to the smartphone via the one or more external networks 109, using a connection that is established between the smartphone and one or more of the servers 105-107 and audio mixing server 122.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and audio mixing server 122, and/or to manage communications between those devices and one or more external networks 109. The audio mixing server 122 may implement an audio mixing system that receives audio content (e.g., audio data comprising audio content that comprises a plurality of audio channels) from computing devices comprising the one or more mobile devices 125. Further, the audio mixing server 122 may, based on processing the received data, generate audio data (e.g., mixed audio data) and send the audio data (e.g., mixed audio data) to the one or more mobile devices 125. For example, the audio mixing server 122 may send the audio data to the one or more mobile devices 125 via the one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the one or more mobile devices 125 via the interface 108 and one or more of the external networks 109, e.g., via one or more of the wireless access points 127.

The push notification server 105 may be configured to generate push notifications to deliver information to devices in the premises 102 and/or to the one or more mobile devices 125. The content server 106 may be configured to provide content to devices in the premises 102 and/or to the one or more mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the one or more mobile devices 125. The local office 103 may comprise additional servers, such as the audio mixing server 122 (described below), additional push, content, and/or application servers, and/or other types of servers. Also or alternatively, one or more of the push server 105, the content server 106, the application server 107, and/or the audio mixing server 123 may be part of the external network 109 and may be configured to communicate (e.g., via the local office 103) with computing devices located in or otherwise associated with one or more premises 102. Although shown separately, the push server 105, the content server 106, the application server 107, the audio mixing server 122, and/or other server(s) may be combined. The servers 105, 106, 107, and audio mixing server 122, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the one or more mobile devices 125, which may be on- or off-premises.

The one or more mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
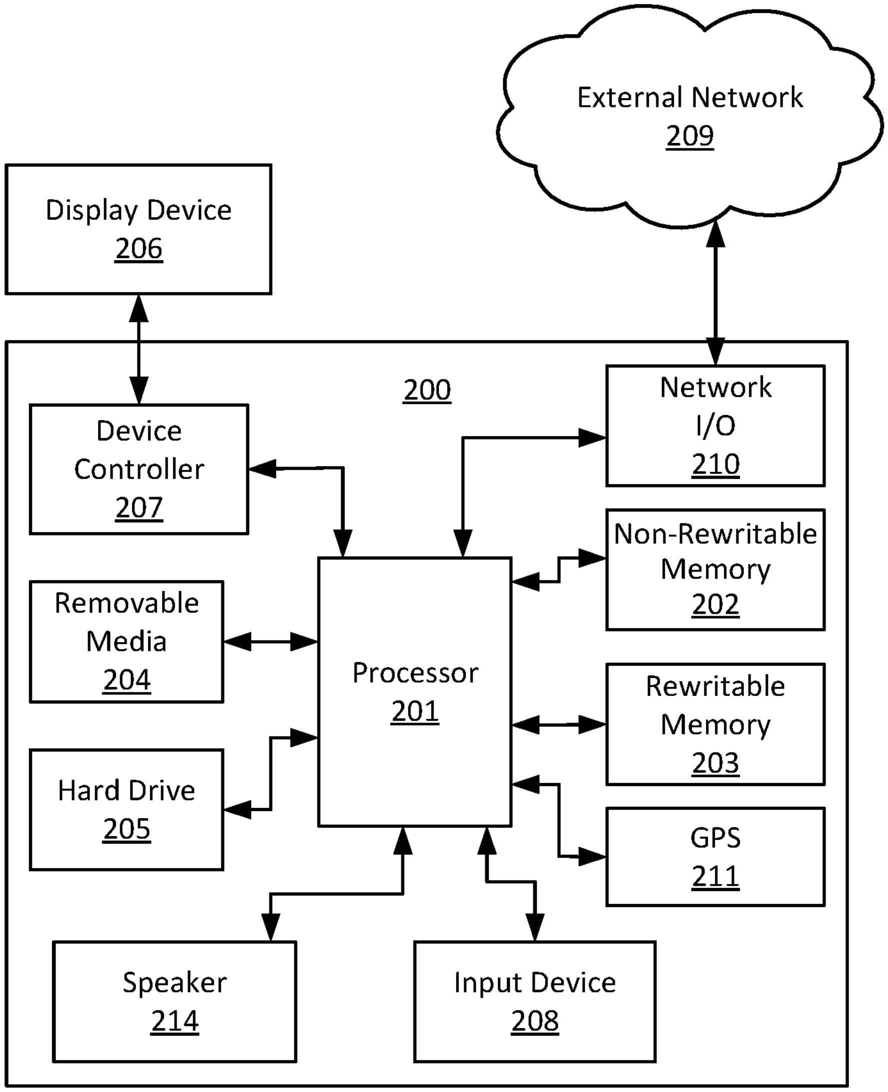
FIG. 2 shows hardware elements of a computing device.

FIG. 2 shows hardware elements of a computing device 200 that may be used to implement any of the computing devices shown in FIG. 1 (e.g., the one or more mobile devices 125, any of the devices shown in the premises 102*a*, any of the devices shown in the local office 103, any of the wireless access points 127, any devices with the external network 109) and any other computing devices described herein (e.g., the audio mixing server 122). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or Bluetooth transceiver. The computing device 200 may comprise one or more user input devices 208. The one or more user input devices 208 may comprise a remote control, a keyboard, a mouse, a touch screen (which may be integrated with the display device 206), microphone, a camera, one or more buttons, etc. The computing device 200 may comprise one or more sensors. The one or more sensors may comprise a camera, a microphone, a motion sensor (e.g., an accelerometer), a thermal sensor, a heart rate sensor, and/or a tactile sensor. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 described above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
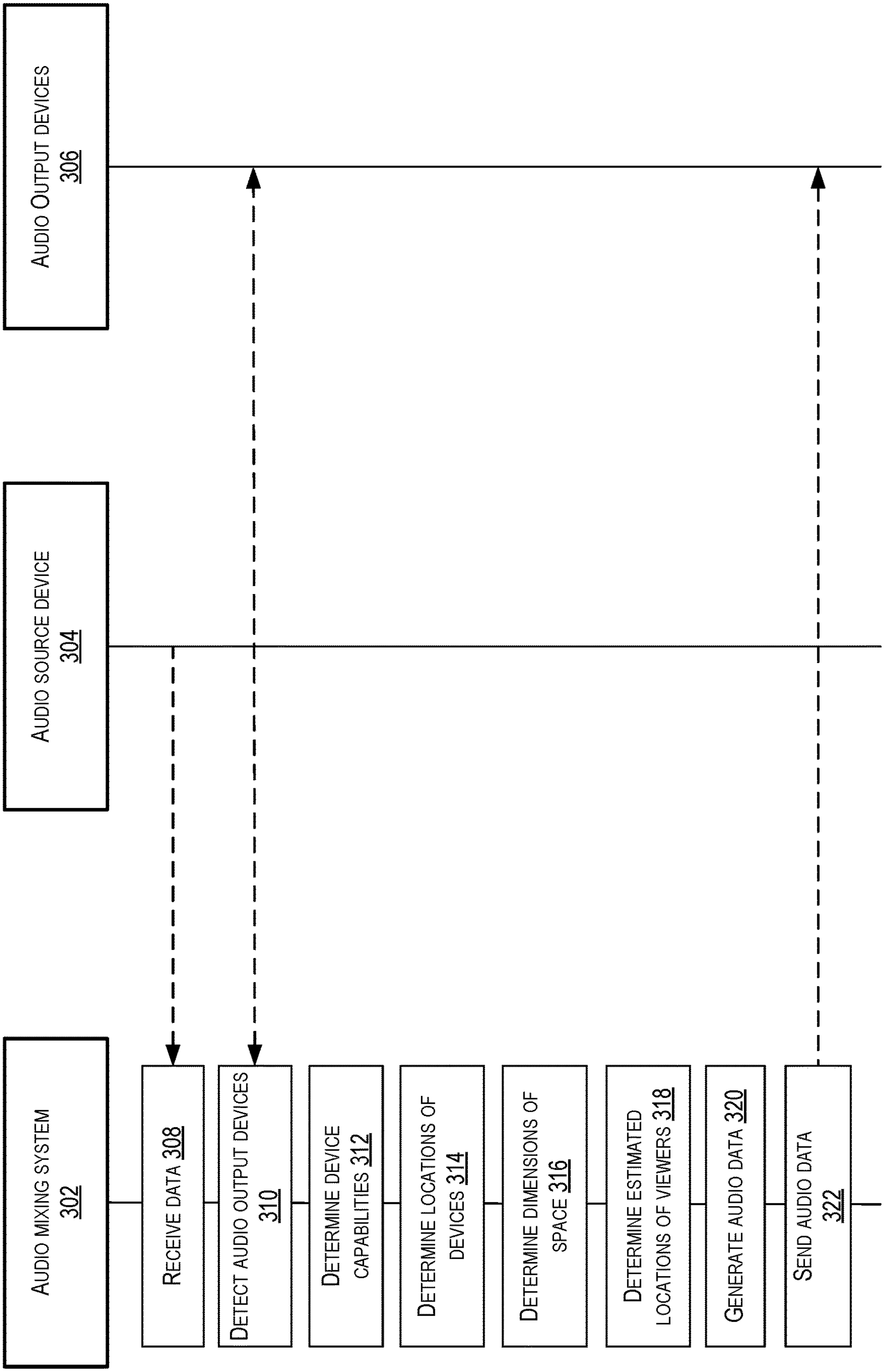
FIG. 3 shows an event sequence for generating audio data for audio output devices.

FIG. 3 shows an event sequence for generating audio data for audio output devices according to aspects of the disclosure. Referring to FIG. 3, at 308, an audio mixing system 302 may receive data comprising an indication of audio content from an audio source device 304 (e.g., content server 106). For example, a content server may send data comprising audio-video content to a television that is configured to output the audio-video content. The television may be part of audio mixing system 302 which may comprise a computing device that is configured to mix the audio content of the audio-video content.

At 310, the audio mixing system 302 may detect audio output devices 306. For example, when the data comprising the indication of audio content is received by the audio mixing system 302, the audio mixing system 302 may scan a network to which the audio mixing system 302 is connected in order to determine audio output devices 306 that are connected to the network. By way of further example, the audio mixing system 302 may detect the audio output devices 306 (e.g., the one or more mobile devices 125 comprising one or more smartphones) based on the audio output devices 306 being connected to the same network (e.g., a Wi-Fi network) as the audio mixing system 302. Further, the audio mixing system 302 may comprise sensors that are configured to detect the audio output devices 306 based on detection of one or more signals (e.g., electronic signals, sound signals, and/or light signals) emitted by thee audio output devices 306.

At 312, the audio mixing system 302 may determine device capabilities of the audio output devices 306. For example, the audio mixing system 302 may identify the audio output devices 306 based on receiving data that indicates device capabilities of the audio output devices 306. The data indicating the device capabilities of the audio output devices 306 may be sent from the audio output devices 306 and/or another device that is configured to communicate with the audio output devices 306 (e.g., the interface 120 which may comprise a gateway or other device that may receive the data indicating the device capabilities from the audio output devices 306). The data indicating the device capabilities of the audio output devices 306 may comprise a number of speakers in each of the audio output devices 306, a position of speakers in each of the audio output devices 306, and/or types of speakers (e.g., tweeters, woofers, subwoofer, and/or midrange speaker) in each of the audio output devices 306. For example, the audio mixing system 302 may access the data indicating the device capabilities of the audio output devices 306 and determine a range of volumes, range of frequencies, and number of speakers in each of the audio output devices 306.

At 314, the audio mixing system 302 may determine locations of the audio output devices 306. For example, the audio mixing system 302 may comprise one or more sensors (e.g., one or more microphones) that may be configured to detect sounds. Further, the audio mixing system 302 may use echolocation to determine the locations of the audio output devices 306 that generated the sounds that were detected. Further, the audio mixing system 302 may determine the location of the audio output devices 306 based on detection of wireless signals (e.g., ultrawideband radio signals) generated by the audio output devices 306. Additionally, the audio mixing system 302 may determine locations of the audio output devices 306 based on use of one or more cameras and a machine learning model. For example, the one or more cameras may capture images of a space comprising the audio output devices 306 and the images may be inputted into a machine learning model that is configured to determine the locations of the audio output devices 306 based on the images. Further, the audio output devices 306 may be detected based on data that is transmitted to the audio mixing system 302 and which indicates the location of the audio output devices 306. For example, the audio output devices 306 may send data indicating a room of a house in which an audio output device 306 is located.

At 316, the audio mixing system 302 may determine dimensions of a space that includes the audio output devices 306. For example, the audio mixing system 302 may cause a speaker (e.g., a speaker that is located in a space that includes the audio output devices 306) to generate sounds may be reflected by surfaces in the space (e.g., walls and/or furniture). The audio mixing system 302 may use echolocation to determine the locations of surfaces (e.g., walls) that echo the sounds generated by the speaker in the space (e.g., a room) in which the audio output devices 306 are located. Based on the locations of the surfaces, the audio mixing system 302 may determine dimensions of a space (e.g., the length, width, and/or height of a room). Further, the audio mixing system 302 may determine dimensions of a space that includes the audio output devices 306 based on use of one or more cameras and a machine learning model. For example, the one or more cameras may capture images of the space comprising the audio output devices 306 and the images may be inputted into a machine learning model that is configured to determine the dimensions of the space based on the images.

At 318, the audio mixing system 302 may determine estimated locations and/or estimated positions of viewers of content outputted by audio source device 304. For example, the audio mixing system 302 may use a camera to capture images of the space that includes the audio source device 304 and/or the audio output devices 306. The audio mixing system 302 may then determine the locations and/or positions of the viewers based on detection and/or recognition. For example, the audio mixing system 302 may implement a machine learning model that is configured to determine estimated locations and/or estimated positions of viewers based on detection and/or recognition of viewers within input comprising the images of the space.

At 320, the audio mixing system 302 may generate audio data (e.g., mixed audio data). The audio data (e.g., mixed audio data) may comprise indications of audio channels that are assigned to the audio output devices 306. Further, the audio mixing system 302 may use the dimensions of the space (e.g., the room the viewers are in) as well as the audio capabilities (e.g., number of speakers, frequency response, and/or loudness threshold) and locations of the audio output devices 306 to generate audio data (e.g., mixed audio data). For example, the audio content may comprise two channels (e.g., stereo channels comprising a left channel and a right channel) in the original audio mix. The audio mixing system 302 may process the two channels in the original audio mix and determine the types of audio content that is associated with each channel. The audio mixing system 302 may then use generate audio data (e.g., mixed audio data) based on the device capabilities of the audio output devices 306. For example, if there are five audio output devices 306, the audio mixing system 302 may generate audio data (e.g., mixed audio data) that indicates five channels instead of two channels in the original audio mix. The audio mixing system 302 may determine that the audio output devices 306 that have greater low frequency capabilities may be assigned a low frequency channel, the audio output devices 306 that have greater high frequency capabilities may be assigned a high frequency channel, and the audio output devices 306 that have greater mid-range capabilities may be assigned a mid-range channel.

Further, the audio mixing system 302 may use the dimensions of the space to determine the volume of audio that is outputted by each of the audio output devices 306. For example, the volume outputted by the audio output devices 306 may be greater if a space is larger or lower if a space is smaller. Further, the audio mixing system 302 may use the locations of the viewers to determine the channel that is assigned to each of the audio output devices 306. For example, rear channels may be assigned to audio output devices 306 that are behind the detected viewers, a left channel may be assigned to audio output devices 306 that are to the left of viewers, and a right channel may be assigned to audio output devices 306 that are to the right of viewers.

At 322, the audio mixing system 302 may send the audio data (e.g., mixed audio data) to the audio output devices 306. The audio mixing system 302 may determine the audio output devices 306 that may output each of the audio channels indicated in the audio data (e.g., mixed audio data) and send each of the audio output devices 306 the audio data which may indicate the audio channel that each of the audio output devices 306 may output. For example, if the audio data (e.g., mixed audio data) indicates two channels (e.g., a left and right channel) the audio mixing system 302 may send the audio data (e.g., mixed audio data) to the audio output devices 306 that may output mixed audio based on the audio data (e.g., mixed audio data). Further, the audio remixing system may wirelessly send the audio data (e.g., mixed audio data) to the audio output devices 306.

Figure 4:
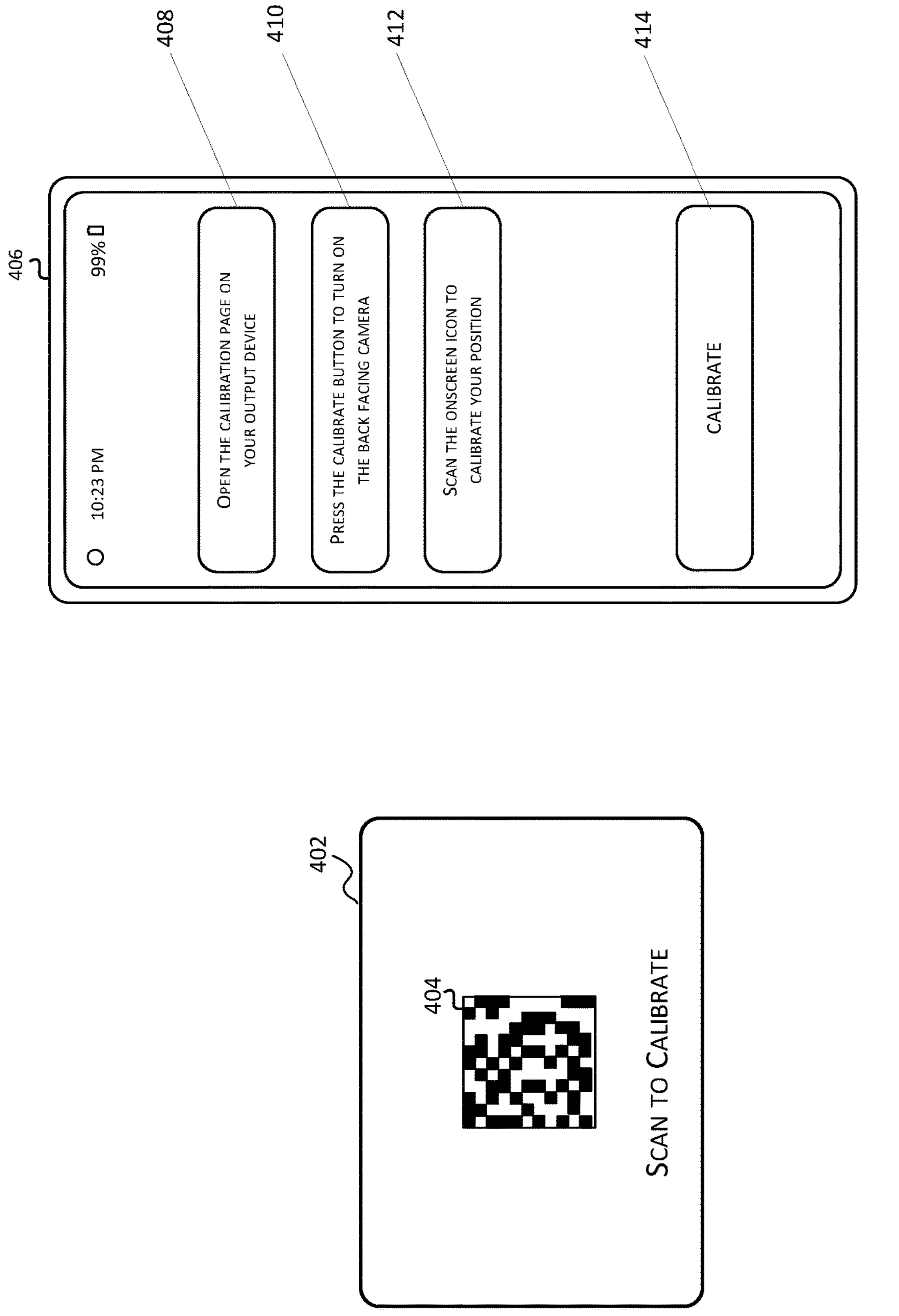
FIG. 4 shows an example of calibrating an audio output device.

FIG. 4 shows an example of calibrating an audio output device. Any appropriate computing device such as the computing devices shown in FIGS. 1-2 (e.g., the one or more mobile devices 125 and/or the audio mixing server 122) and/or any other computing devices described herein may be used to implement any of the operations described herein.

Computing device 406 (e.g., a smartphone) may display a user interface that includes interface elements 408-414, which may be used to calibrate of computing device 406. Calibrating computing device 406 may comprise determining the position and/or location of computing device 406 relative to some point of reference (e.g., a location and/or position relative to display device 402). In this example, interface element 408 may indicate "OPEN THE CALIBRATION PAGE ON YOUR OUTPUT DEVICE." Based on an interaction (e.g., a user touching the interface element 408), computing device 406 may send a request to display a calibration web page on display device 402. The calibration page may comprise an image that the computing device 406 may use to determine the position and/or location of the computing device 406.

Based on receiving and accepting the request to display the calibration page, the display device 402 (e.g., display device 112) may generate and display a user interface that includes the interface element 404. In this example, the interface element 404 is a QR (quick response) code that includes the calibration page that may be used to calibrate an audio output device (e.g., computing device 406). Interface element 410 may indication "PRESS THE CALIBRATION BUTTON TO TURN ON THE BACK FACING CAMERA." Bases on an interaction by a user with the interface element 414, which indicates "CALIBRATE" a user may turn on a back facing camera (e.g., a camera on the side of the computing device 406 that is opposite the display component of the computing device 406 that displays the interface elements 408-414. Further, interface element 412 indicates "SCAN THE ONSCREEN ICON TO CALIBRATE YOUR POSITION" computing device 406.

After positioning computing device 406 so that interface element 404 is captured by a camera of computing device 406, the position and/or location of computing device 406 relative to display device 402 may be determined. The position and/or location of computing device 406 may be used to determine an audio configuration of one or more audio output devices. The location and/or position of computing device 406 may be used to mix audio content in order to enhance outputted audio and/or achieve improved surround sound audio. For example, if computing device 406 is the only audio output device apart from display device 402, and is located directly in front of display device 402, then computing device 406 may be used as the center channel for audio content that is outputted from display device 402.

Figure 5:
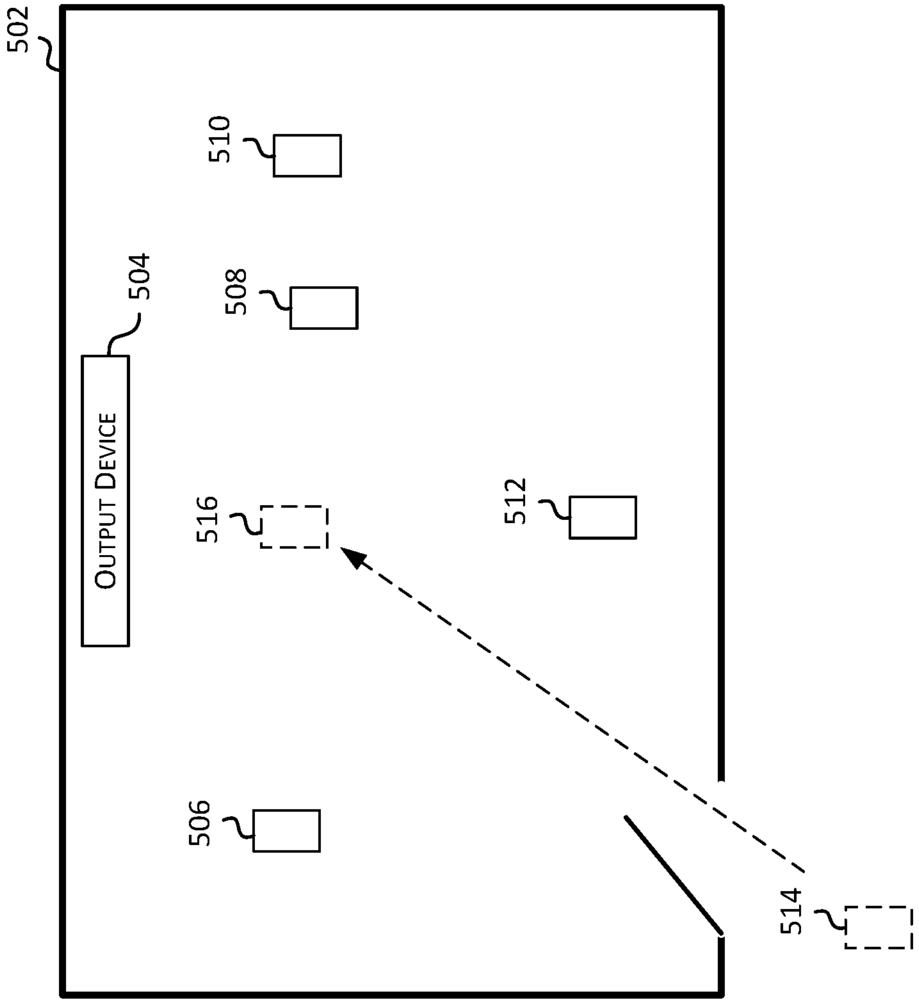
FIG. 5 shows an example of an overhead view of adding an audio output device to a room including other audio output devices.

FIG. 5 shows an example of an overhead view of adding an audio output device to a room including other audio output devices. Any of the computing devices shown in FIGS. 1-2 (e.g., the one or more mobile devices 125 and/or the audio mixing server 122) and/or any other computing devices described herein may be used to implement any of the operations described herein.

In FIG. 5, audio-video content comprising data indicating audio content (e.g., a movie) may be outputted via the output device 504. The output device 504 (e.g., a display device) may comprise a computing device that may be configured to receive and/or process the audio-video content, an output device (e.g., a video monitor with one or more loudspeakers), and at least one sensor (e.g., a camera and/or a microphone) that may be used to detect devices (e.g., audio output devices) and/or dimensions of the environment around the output device 504. Further, the output device 504 may be configured to perform operations to detect the location of audio output devices, detect a number of audio output devices, determine capabilities of audio output devices, and/or generate audio data (e.g., mixed audio data) based on received audio content. In this example, the output device 504 had initially determined that audio output devices were located at locations 506-512 within the space 502 (e.g., a room). Based on the dimensions of space 502, the capabilities of the devices detected at locations 506-512, and the locations 506-512 of the detected devices, the output device generated first audio data (e.g., first mixed audio data). In the first audio data (e.g., first mixed audio data), the device at location 506 may have been assigned to a left audio channel, the device at location 508 may have been assigned to a center audio channel, the device at location 510 may have been assigned to a right audio channel, and the device at location 512 may have been assigned to a rear audio channel.

Subsequent to the first audio data (e.g., first mixed audio data) being generated based on the devices at locations 506-512, a device that had previously been located at location 514 and which was not detected due to being outside the space 502, has entered the space 502 and been detected by the output device 504. After the device at location 516 is detected, output device 504 may generate second audio data (e.g., second mixed audio data) which may replace first audio data (e.g., first mixed audio data). The second audio data (e.g., second mixed audio data) may adjust the distribution of audio channels to account for the addition of an audio output device. In the second audio data (e.g., second mixed audio data), the device at location 506 may remain assigned to a left audio channel, the device at location 508 may be reassigned to a right audio channel, the device at location 510 may also be assigned to the right audio channel, the device at location 512 may remain assigned to a rear audio channel, and the device that was detected at location 516 may be assigned to a center audio channel that was previously assigned to the device at location 508.

Figure 6:
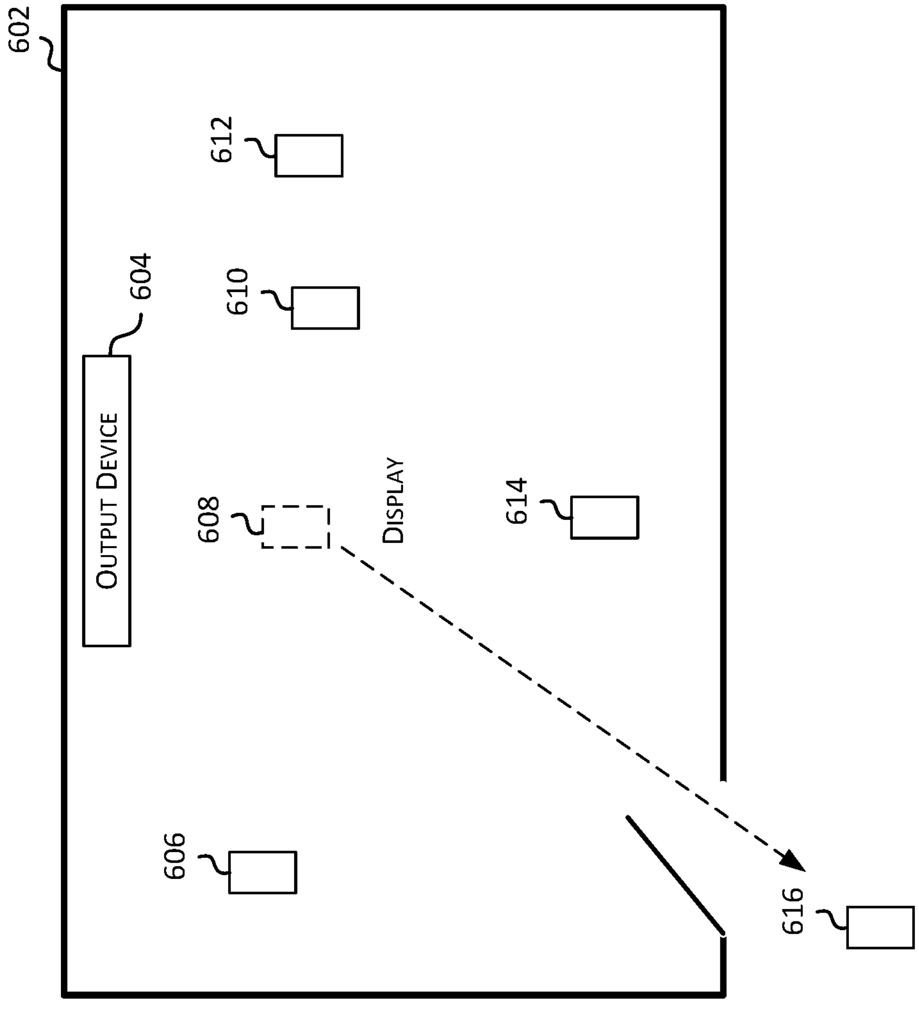
FIG. 6 shows an example of an overhead view of removing an audio output device from a room including other audio output devices.

FIG. 6 shows an example of an overhead view of removing an audio output device from a room including other audio output devices. Any appropriate computing device such as those shown in FIGS. 1-2 (e.g., the one or more mobile devices 125 and/or the audio mixing server 122) and/or any other computing devices described herein may be used to implement any of the operations described herein.

In FIG. 6, audio-video content comprising data indicating audio content (e.g., a movie) may be outputted via the output device 604. The output device 604 (e.g., a display device) may comprise a computing device that may be configured to receive and/or process the audio-video content, an output device (e.g., a video monitor with one or more loudspeakers), and at least one sensor (e.g., a camera and/or a microphone) that may be used to detect devices (e.g., audio output devices) and/or dimensions of the environment around the output device 604. Further, the output device 604 may be configured to perform operations to detect the location of audio output devices, detect a number of audio output devices, determine capabilities of audio output devices, and/or generate audio data (e.g., mixed audio data)

based on received audio content. In this example, the output device 604 had initially determined that audio output devices were located at locations 606-614 within the space 602 (e.g., a room). Based on the dimensions of space 602, the capabilities of the devices detected at locations 606-614, and the locations 606-614 of the detected devices, the output device 604 generated first audio data (e.g., first mixed audio data). In the first audio data (e.g., first mixed audio data), the device at location 606 may have been assigned to a left audio channel, the device at location 608 may have been assigned to a center audio channel, the device at location 610 may have been assigned to a center audio channel, and the device at location 614 may have been assigned to a rear audio channel.

Subsequent to the first audio data (e.g., first mixed audio data) being generated based on the devices at locations 606-612, a device that had previously been detected at location 608 has moved to location 616 which outside the space 602. The output device 604 may detect the change in detected devices and determine that the device that had previously been at located at the location 608 has left the space 602. The output device 604 may then generate second audio data (e.g., second mixed audio data) which may replace first audio data (e.g., first mixed audio data). In the second audio data (e.g., second mixed audio data), the device at location 606 may remain assigned to a left audio channel, the device at location 610 may remain assigned to center audio channel, the device at location 612 may remain assigned to a right audio channel, and the device at location 614 may remain assigned to the rear audio channel. To compensate for the removal of the device that had previously been located at the location 608, the second audio data (e.g., second mixed audio data) may increase the loudness of the center audio channel that is assigned to audio output device at location 610.

Figure 7:
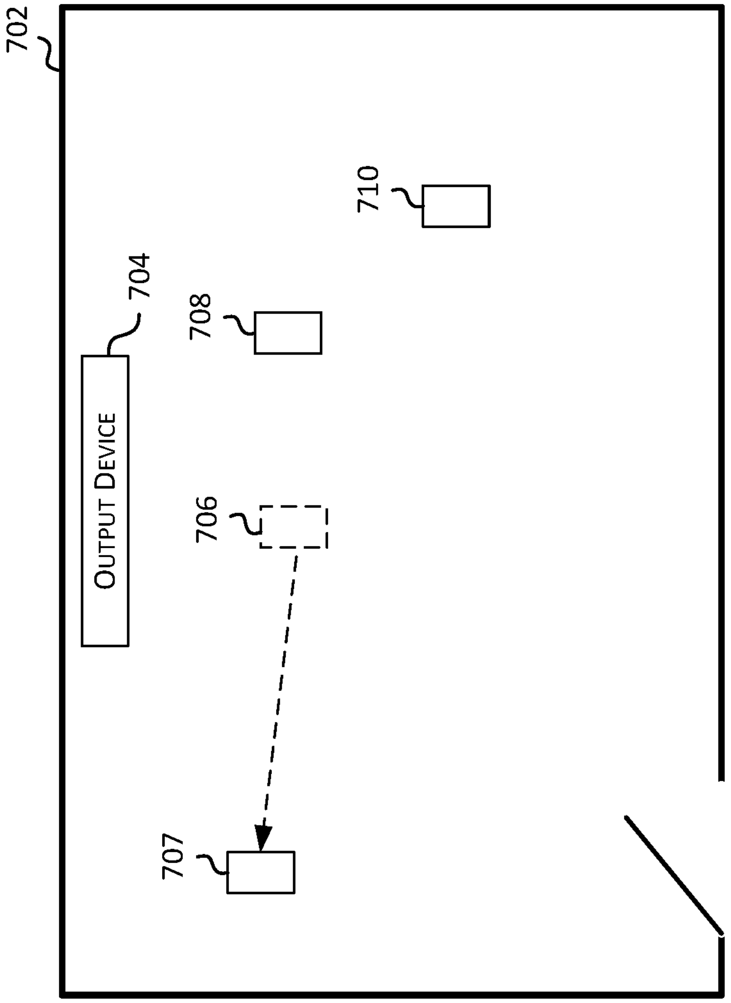
FIG. 7 shows an example of an overhead view of changing a location of an audio output device in a room including other audio output devices.

FIG. 7 shows an example of an overhead view of changing a location of an audio output device in a room including other audio output devices. Any of the computing devices shown in FIGS. 1-2 (e.g., the one or more mobile devices 125 and/or the audio mixing server 122) and/or any other computing devices described herein may be used to implement any of the operations described herein.

In FIG. 7, audio-video content comprising data indicating audio content (e.g., a movie) may be outputted via the output device 704. The output device 704 (e.g., a display device) may comprise a computing device that may be configured to receive and/or process the audio-video content, an output device (e.g., a video monitor with one or more loudspeakers), and at least one sensor (e.g., a camera and/or a microphone) that may be used to detect devices (e.g., audio output devices) and/or dimensions of the environment around the output device 704. Further, the output device 704 may be configured to perform operations to detect the location of audio output devices, detect a number of audio output devices, determine capabilities of audio output devices, and/or generate audio data (e.g., mixed audio data) based on received audio content. In this example, the output device 704 had initially determined that audio output devices were located at locations 706, 708, and 710 within the space 702 (e.g., a room). Based on the dimensions of space 702, the capabilities of the devices detected at locations 706, 708, and 710, and the locations 706, 708, and 710 of the detected devices, the output device 704 generated first audio data (e.g., first mixed audio data). In the first audio data (e.g., first mixed audio data), the device at location 706 may have been assigned to a left audio channel, the device at location 708 may have been assigned to a center audio channel, and the device at location 710 may have been assigned to a right audio channel.

Subsequent to the first audio data (e.g., first mixed audio data) being generated based on the devices at locations 706, 708, and 710, the device that had previously been located at location 706 may have relocated to location 707. After the relocation of the device from location 706 to location 707, output device 704 may generate second audio data (e.g., second mixed audio data) which may replace the first audio data (e.g., first mixed audio data). The second audio data (e.g., second mixed audio data) may adjust the distribution of audio channels to account for the relocation of an audio output device from the location 706 to the location 707. In the second audio data (e.g., second mixed audio data), the audio output device that moved from location 706 to location 707 may remain assigned to a left audio channel, the audio output device at location 708 may remain assigned to a center audio channel, and the audio output device at location 710 may also remain assigned to the right audio channel. To account for the movement of the audio output device from location 706 to location 707, the second audio data (e.g., second mixed audio data) may increase the loudness of the left audio channel that is outputted by the device located at location 707. Further, the loudness of the center audio channel outputted by the device at locations 708 and 710 may be adjusted to account for the movement of the audio output device from location 706 to location 707.

Figure 8A:
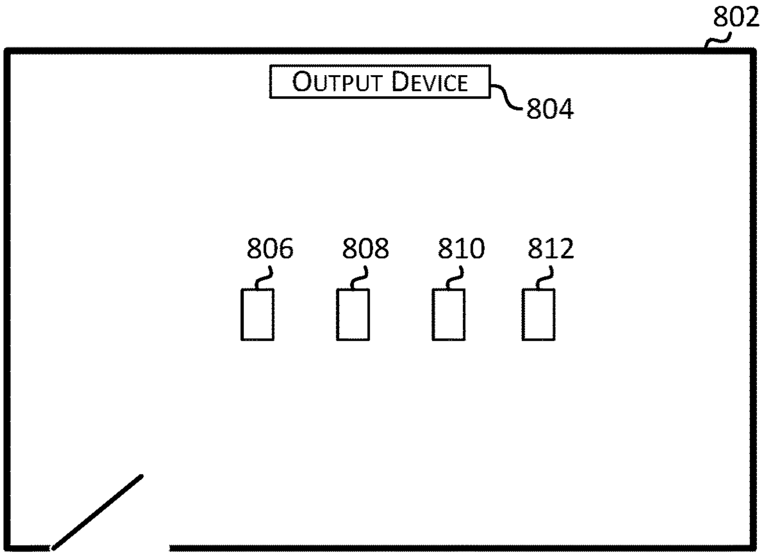
FIGS. 8A-8B show examples of an overhead view of audio output devices and a user interface including indications prompting users to change locations of the audio output devices based on a preferred spatial configuration.
Figure 8B:
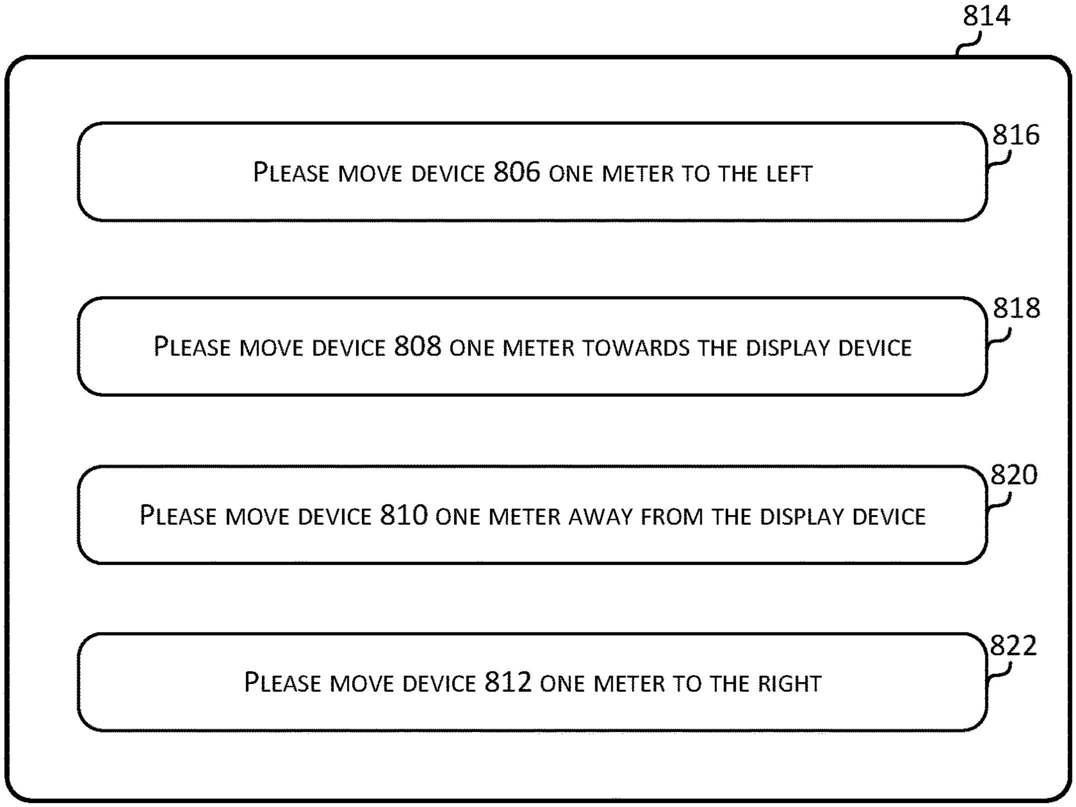

FIGS. 8A-8B show examples of an overhead view of audio output devices and a user interface including indications prompting users to change locations of the audio output devices based on a preferred spatial configuration. Any of the computing devices shown in FIGS. 1-2 (e.g., the one or more mobile devices 125 and/or the audio mixing server 122) and/or any other computing devices described herein may be used to implement any of the operations described herein.

In FIG. 8, audio-video content comprising data indicating audio content is being outputted via the output device 804. The output device 804 may comprise a computing device that may be configured to receive and/or process the audio-video content, an output device (e.g., a video monitor with one or more loudspeakers), and at least one sensor (e.g., a camera and/or a microphone) that may be used to detect devices (e.g., audio output devices) and/or dimensions of the environment around the output device 804. Further, the output device 804 may be configured to perform operations to detect the location of audio output devices, detect a number of audio output devices, determine capabilities of audio output devices, and/or generate audio data (e.g., mixed audio data) based on received audio content. In this example, the output device 804 has determined that audio output are located at locations 806-812. Based on the audio capabilities of the detected audio output devices, the locations of the detected audio output devices, and/or the dimensions of the space 802, the output device 804 may generate a preferred spatial configuration for the detected devices.

Based on the preferred spatial configuration, the output device 804 may generate instructions on the display 814 which is included in the output device 804. The instructions may comprise instructions to place the detected audio devices at a plurality of preferred locations that may result in an improved audio mix. The instructions may comprise instructions to move an audio output device in a particular direction, move an audio device closer to an object (e.g., an output device or a wall of a space), and/or further away from an object (e.g., another audio output device). In this example, instruction 816 indicates "PLEASE MOVE THE DEVICE 806 ONE METER TO THE LEFT," instruction 818 indicates "PLEASE MOVE DEVICE 808 ONE METER TOWARDS THE OUTPUT DEVICE," instruction 820 indicates "PLEASE MOVE DEVICE 810 ONE METER AWAY FROM THE DISPLAY DEVICE," and instruction 822 indicates "PLEASE MOVE DEVICE 812 TO THE RIGHT SO THAT IT IS ONE METER FROM THE RIGHT WALL."

Figure 9:
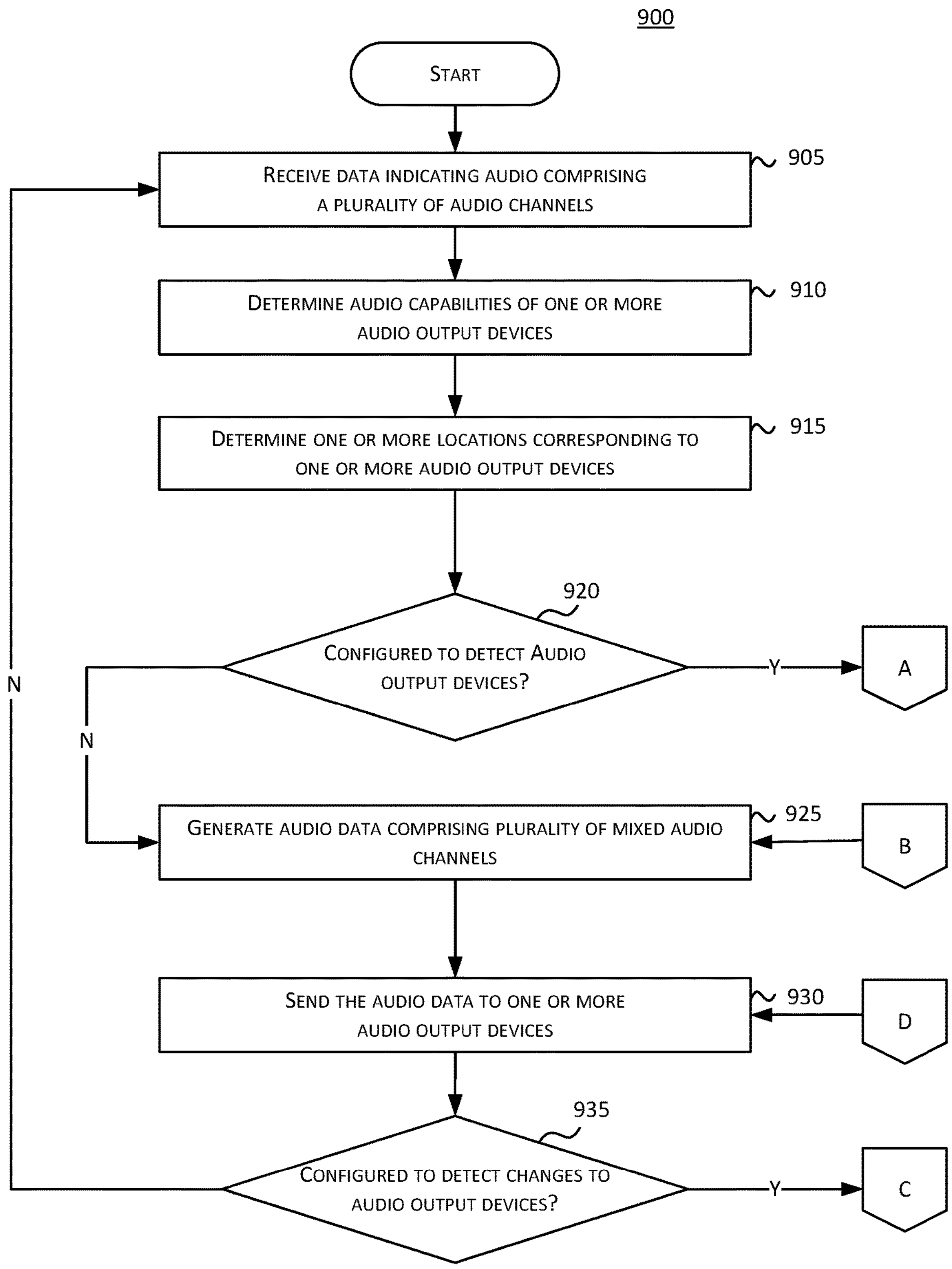
FIG. 9 is a flow chart illustrating an example method for generating audio data.

FIG. 9 is a flow chart showing an example method for generating audio data according to aspects of the disclosure. The method 900 may be performed by any device described herein, including the one or more mobile devices 125. Further, any part of the method 900 may be performed as part of the method 1000 and/or the method 1100. One, some, or all parts of the method 900 may be omitted, performed in other orders, and/or otherwise modified, and/or one or more additional parts may be added.

In 905, data indicating audio content may be received. The data indicating audio may comprise video content in addition to audio content. For example, the computing device 200 may receive audio-video data for a show that comprises video and audio content. For example, the data may comprise streaming audio-video content that comprises a stream of image content and audio content. Further, the data may be received by a computing device (e.g., the display device 206 and/or any device that is capable of receiving data indicating audio content). For example, the computing device may comprise any combination of a television, a smartphone, a tablet computing device, and/or a loudspeaker.

The audio content may comprise a plurality of audio channels. Further, the plurality of audio channels may correspond to different audio that may be associated with a type of audio, a device from which the audio may be outputted, and/or a location from which the audio may be outputted. For example, the audio content may comprise a low frequency channel that is used for low frequency sounds and a center channel, left channel, right channel, and rear channel that comprise audio sent to speakers located at the center and to the left, right, and rear relative to a display device that receives the data indicating audio content. The plurality of audio channels may comprise a speech channel that is used for spoken audio. For example, a speech channel may be used for dialogue that is spoken between actors of a television show and/or movie.

In 910, audio capabilities of one or more audio output devices (e.g., one or more mobile devices that may comprise one or more smartphones) may be determined. Determination of audio capabilities of one or more audio output devices may be based on data that indicates one or more audio output devices that are available to receive and/or output audio based on audio data (e.g., mixed audio data). For example, computing device 200 may access data that indicates audio output devices that are wirelessly connected to the display device via blue-tooth connections and/or via a shared wi-fi connection. Further, computing device 200 may access data indicating the audio capabilities of the one or more audio output devices that are wirelessly connected to the display device. The one or more audio output devices may for comprise one or more audio output devices described herein, including the one or more audio output devices described with respect to FIGS. 1-8.

The audio capabilities of the one or more audio output devices may comprise a number of speakers included in each of the one or more audio output devices (e.g., a smartphone with one speaker or a wireless speaker with four speakers), a position of speakers on each of the one or more audio output devices (e.g., a smartphone with a single speaker that is positioned at the bottom edge of the smartphone), a size (e.g., a surface area of a speaker in centimeters) and/or type (e.g., woofer, tweeter, subwoofer, and/or midrange driver) of speakers of an audio output device, and/or a wattage of an audio output device that may correspond to the loudness of the audio output device. Further, audio capabilities of the one or more audio output devices may comprise software capabilities of the one or more audio output devices. Further, audio output devices may comprise audio capabilities to process and/or use certain types of audio codecs and/or protocols. For example, an audio output device may comprise software and/or hardware that allows the audio output device to decompress compressed audio data (e.g., data indicating audio content). Further, an audio output device may comprise software and/or hardware that allows the audio output device to decrypt encrypted audio data.

Determining audio capabilities of the one or more audio output devices may comprise determining one or more media access control (MAC) addresses of the one or more audio output devices. For example, the computing device 200 may scan a network to which it is connected in order to determine the MAC address for computing devices that are also connected to the network. Further, the computing device may match the one or more MAC addresses to one or more audio output device profiles that correlate the one or more MAC addresses to the audio capabilities of the one or more audio output devices. For example, the computing device may store audio output device profiles that comprise identifiers of different audio output devices and the audio capabilities corresponding to the audio output device. Based on matching the MAC address that was detected to the audio output device profile, the audio capabilities of the audio output device may be determined.

The audio capabilities of the one or more audio output devices may comprise a plurality of frequency response ranges. For example, an audio output device may have a frequency response range of 300 Hz to 5,000 kHz. The frequency response range of an audio output device may be used to determine the type of audio channel that may be assigned to an audio output device.

The audio capabilities of the one or more audio output devices may comprise a plurality of loudness thresholds. For example, the audio capabilities of the one or more audio output devices may comprise a loudness threshold that indicates an upper threshold in decibels that may be generated by an audio output device.

The one or more audio output devices may comprise a display device. Further, the plurality of audio channels and/or a plurality of mixed audio channels (e.g., a plurality of mixed audio channels generated in 930) may comprise at least one center channel that is outputted via the display device. For example, a display device may comprise three speakers that output audio to a center channel, a left channel, and a right channel.

In 915, one or more locations corresponding to the one or more audio output devices may be determined. For example, an audio output device may emit one or more electronic signals that a computing device may use to identify the audio output device and/or a location of the audio output device. Further, a computing device may determine a location of an audio output device based on accessing a network to which an audio output device is connected and retrieving data (e.g., location data provided by the audio output device) that indicates the location of the audio output device. A computing device may comprise a camera that is configured to capture an image of an audio output device and then determine the location of the audio output device based on analysis of the image. For example, analysis of an image may be based on inputting the image into a machine learning model that is configured to recognize one or more audio output devices and determine the location of the one or more audio output devices within the image.

A computing device may comprise a microphone that is configured to detect sounds emitted by an audio output device and then determine the location of the audio output device based on analysis of the sounds (e.g., echolocation based on analysis of beeping sounds emitted by an audio output device). A location of an audio output device may comprise a location relative to the location of a device that receives data indicating audio content (e.g., a location of a smartphone relative to the location of a television), a set of geographic coordinates (e.g., latitude, longitude, and/or altitude), and/or an identified location that is associated with a geographic location (e.g., the family room of a house located at a particular geographic location).

Determining the one or more locations corresponding to the one or more audio output devices may comprise receiving the one or more locations corresponding to the one or more audio output devices based on one or more the audio output devices scanning a quick response (QR) code displayed on a web page configured to send the one or more locations corresponding to the audio output devices to the computing device. For example, a computing device may generate a QR code on a user interface displayed by the computing device. Based on an audio output device scanning the QR code, the location of the audio output device that scanned the QR code relative to the location of the computing device that generated the QR code may be determined and sent to the audio output device.

Determining the one or more locations corresponding to the one or more audio output devices may comprise detecting ultrawideband radio signals emitted by the one or more audio output devices. For example, a computing device may be configured to detect ultrawideband radio signals that are emitted by audio output devices. Further, determining the one or more locations corresponding to the one or more audio output devices may be based on the ultrawideband radio signals. For example, a computing device may be configured to determine a signal strength and/or signal angle that may be used to determine the location of the audio output device that generated the signal.

Determining the one or more locations corresponding to the one or more audio output devices may comprise retrieving an audio configuration indicating one or more locations of the one or more audio output devices. For example, if there are two audio output devices, an audio configuration may indicate that a first audio output device is located to the left of a display device that is being used to output audio-video content comprising the audio content and that a second audio output device is located to the right of the display device. Based on the locations of the two audio output devices, the audio data (e.g., mixed audio data) may indicate that a left audio channel is assigned to the audio output device that is to the left of the display device and that a right audio channel is assigned to the device that is to the right of the display device.

In 920, there may be a determination of whether the computing device that receives the data indicating audio content is configured to detect one or more audio output devices. Based on the computing device being configured to detect one or more audio output devices, 1005 may be performed by way of the "A" connector. For example, a computing device (e.g., the display device 112) may access data that indicates whether the computing device is configured to use one or more sensors to detect one or more audio output devices. Based on the data indicating that the computing device is configured to detect one or more audio output devices, the computing device may detect one or more audio output devices in 1005.

Based on the computing device not being configured to detect one or more audio output devices, 925 may be performed. For example, a computing device (e.g., the display device 112) may attempt to access data that indicates whether the computing device is configured to use one or more sensors to detect one or more audio output devices. Based on the data indicating that the computing device is configured to detect one or more audio output devices not being available and/or the data indicating that the computing device is not configured to detect one or more audio output devices, the computing device may generate audio data (e.g., mixed audio data) in 925.

In 925, audio data (e.g., mixed audio data) may be generated. The audio data (e.g., mixed audio data) may be based on the data indicating the audio content, the audio capabilities, and/or the one or more locations corresponding to the one or more audio output devices that were determined for the one or more audio output devices. Further, the audio data (e.g., mixed audio data) may indicate a plurality of mixed audio channels corresponding to the one or more audio output devices. For example, a computing device (e.g., the computing device 200) may access the audio content and generate audio data (e.g., mixed audio data) comprising audio content that has been modified based on the audio capabilities of the one or more audio output devices. Further, if the data indicating audio content indicated three audio channels and there are two audio output devices with audio capabilities that allow the audio output devices to operate as a left audio channel and a right audio channel, then the audio data (e.g., mixed audio data) may comprise five audio channels in which the two audio output devices are assigned to the left audio channel and the right audio channel.

By way of further example, the data indicating audio may indicate that the one or more audio output devices comprise two audio output devices, a first of which is located on the left side of a device (e.g., a television) that receives the data indicating audio and a second of which is located on the right side of the device that receives the data indicating audio. A computing device may then generate audio data (e.g., mixed audio data) indicating that a left audio channel is assigned to the first audio output device located on the left side and that a right audio channel is assigned to the second audio output device located on the right side.

Generating the audio data (e.g., mixed audio data) may comprise determining the plurality of mixed audio channels corresponding to the one or more audio output devices based on the plurality of frequency response ranges of the one or more audio output devices. For example, an audio output device may have a frequency response range of 20 Hz to 200 Hz may be able to generate low frequency audio. The audio data (e.g., mixed audio data) that is generated may indicate that a rear audio channel is assigned to the audio output device that is able to generate low frequency audio.

Generating the audio data (e.g., mixed audio data) may comprise determining the plurality of mixed audio channels corresponding to the one or more audio output devices based on the plurality of loudness thresholds of the one or more audio output devices. For example, if two audio output devices are available to output audio: a first audio output device has a loudness threshold of 80 decibels and a second audio output device that has a loudness threshold of 90 decibels. The audio data (e.g., mixed audio data) that is generated may indicate that a rear channel that is used for non-spoken audio sound effects (e.g., footsteps and/or the sound of an automobile engine revving) is assigned to the first audio output device and that a center audio channel (e.g., a center audio channel that is used for spoken audio) is assigned to the second audio output device.

Generating the audio data (e.g., mixed audio data) may comprise determining the one or more audio output devices from which to output the speech channel based on matching one of a plurality of frequency response ranges of the one or more audio output devices to a frequency response range associated with the speech channel. For example, the frequency response range for speech may range from 80 Hz to 260 Hz. Further, the audio capabilities of three audio output devices may indicate that a first audio output device (e.g., a smartphone) of the three audio output devices comprises speakers that are configured to output the frequency response range for speech more optimally than the other two audio output devices. As a result, the audio data (e.g., mixed audio data) may indicate that a speech channel of the plurality of mixed audio channels is assigned to the first audio output device.

Generating the audio data (e.g., mixed audio data) may comprise determining a number of speakers in each of the one or more audio output devices. For example, if there are three audio output devices, the audio capabilities of the three audio output devices may indicate that a first audio output device has two speakers and that a second audio output device and a third audio output device have one speaker each. Further generating the audio data (e.g., mixed audio data) may comprise generating the audio data (e.g., mixed audio data) based on the number of speakers in each of the one or more audio output devices. For example, if there are two audio output devices (e.g., smartphones) and each audio output device comprises one speaker, the audio data (e.g., mixed audio data) may indicate that a left audio channel is assigned to one audio output device and that a right audio channel is assigned to the other audio output device.

Generating the audio data (e.g., mixed audio data) may comprise determining one or more positions of speakers in each of the one or more audio output devices. For example, if there are two audio output devices, the audio capabilities of the two audio output devices may indicate that a first audio output device is a portable audio system that has two speakers that are thirty centimeters apart and that a second audio output device has one speaker. Further, generating the audio data (e.g., mixed audio data) may be based on the one or more positions of the speakers in each of the one or more audio output devices. For example, if there are two audio output devices, a portable audio system with speakers that are thirty centimeters apart and a smartphone with a single speaker, the audio data (e.g., mixed audio data) may indicate that a left audio channel and right audio channel are assigned to the portable audio system and that a center audio channel is assigned to the smartphone.

Generating the audio data (e.g., mixed audio data) may comprise retrieving an audio configuration indicating dimensions of a space comprising the one or more audio output devices. For example, an audio configuration may indicate dimensions of the space (e.g., a room has a width of five meters, a length of eight meters, and a height of three meters. The computing device may use the shape and/or dimensions of a space to determine how audio may sound in the space based on the audio capabilities of the one or more audio output devices. For example, in a small room with two audio output devices that are smartphones the audio data (e.g., mixed audio data) may use the smartphones as a left audio channel and a right audio channel. In a large room with two audio output devices, a powerful 100 watt wireless speaker and a smartphone with a 5 watt speaker, the audio data (e.g., mixed audio data) may indicate that a center channel is assigned to the wireless speaker and that a rear channel is assigned to the smartphone.

In 930, the audio data (e.g., mixed audio data) may be sent to the one or more audio output devices. For example, display device 112 may send the audio data (e.g., mixed audio data) to one or more mobile devices 125. The audio data (e.g., mixed audio data) may for example be wirelessly (e.g., via the Internet, an intranet, Bluetooth) sent to the one or more audio output devices. Further, the audio data (e.g., mixed audio data) that is sent to the one or more audio output devices may be outputted via the one or more audio output devices.

In 935, there may be a determination of whether the computing device that receives the data indicating audio content is configured to detect one or more changes to the one or more audio output devices. Based on the computing device being configured to detect one or more changes to the one or more audio output devices, 1105 may be performed by way of the "C" connector. For example, a computing device (e.g., the display device 112) may access data that indicates whether the computing device is configured to detect one or more changes to the one or more audio output devices. Based on the data indicating that the computing device is configured to detect one or more changes to the one or more audio output devices, the computing device may detect one or more changes to the one or more audio output devices in 1105.

Based on the computing device not being configured to detect one or more changes to one or more audio output devices, 905 may be performed. For example, a computing device (e.g., the display device 112) may access data that indicates whether the computing device is configured to detect one or more changes to the one or more audio output devices. Detection of the one or more changes to the one or more audio output devices may comprise monitoring the location of the one or more audio output devices and/or determining how many of the one or more audio output devices are being sent audio data (e.g., mixed audio data). Based on the data indicating that the computing device is not configured to detect one or more changes to the one or more audio output devices, the computing device may receive additional data indicating audio in 905.

Figure 10:
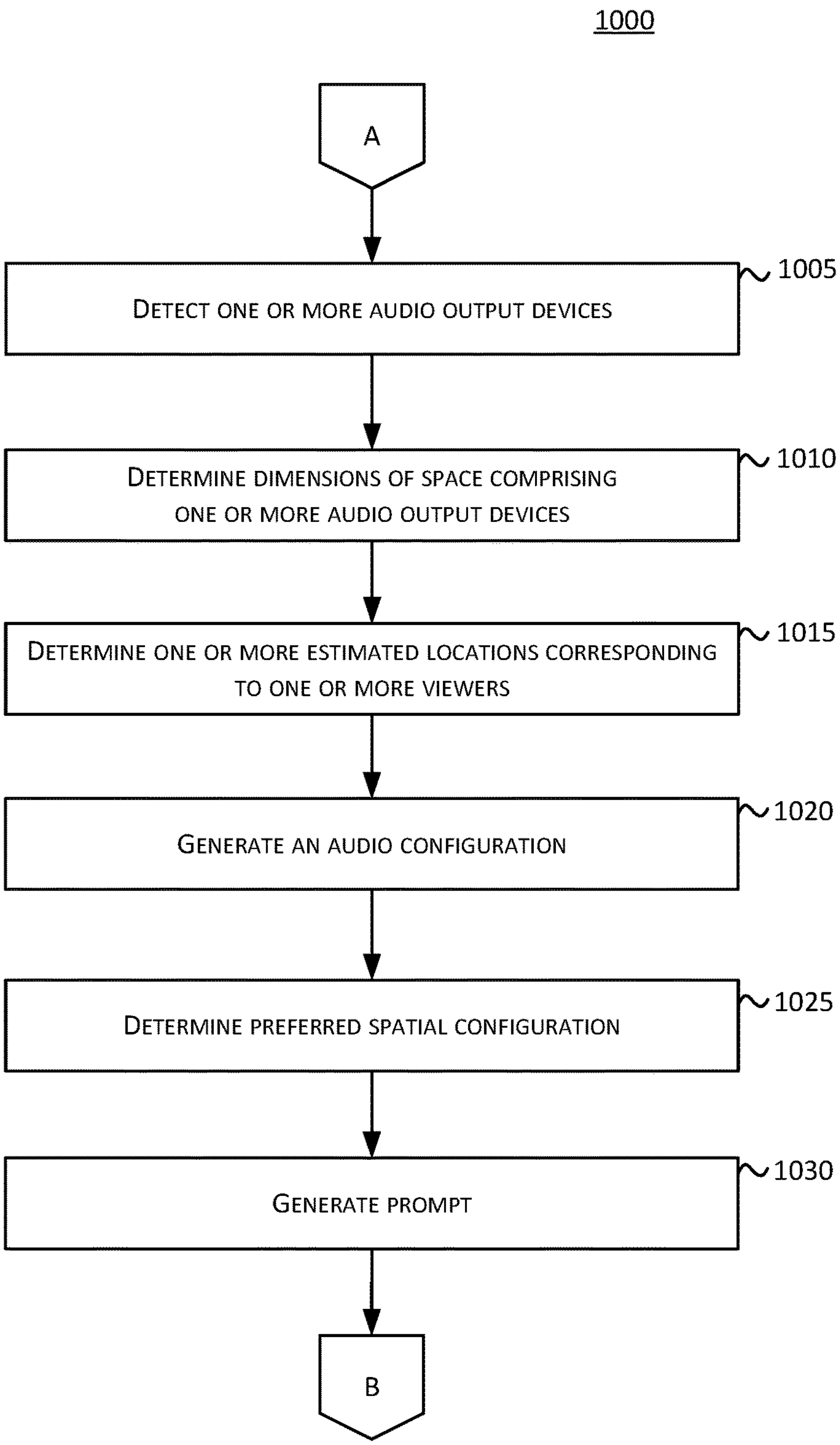
FIG. 10 is a flow chart illustrating an example method for determining dimensions of a space comprising audio output devices and generating a preferred spatial configuration for the audio output devices.

FIG. 10 is a flow chart showing an example method for determining dimensions of a space comprising audio output devices and generating a preferred spatial configuration for the audio output devices according to various aspects of the disclosure. As indicated by the "A" connector in FIG. 9, the method 1000 that is described with respect to FIG. 10 may be performed based on the performance of 920 of the method 900. Further, one or more of the parts of the method 1000 that is described with respect to FIG. 10 may be part of the method 900 that is described with respect to FIG. 9. The method 1000 of FIG. 10 may be performed by any device described herein, including one or more mobile devices 125. One, some, or all parts of FIG. 10 may be omitted, performed in other orders, and/or otherwise modified, and/or one or more additional parts may be added.

In 1005, one or more audio output devices may be detected. Detecting one or more audio output devices (e.g., one or more audio output devices that may comprise one or more mobile devices) may comprise scanning a local network (e.g., an intranet for a single home) to detect data that is associated with one or more audio output devices that are connected to the local network. For example, the one or more audio output devices may send and/or receive data indicating the presence of the one or more devices on a network, that the one or more audio output devices are configured to receive data comprising audio-video content, and/or audio capabilities of the one or more audio output devices.

Detecting one or more audio output devices may comprise detecting one or more signals (e.g., electronic signals, sound signals such as a beeping sound, and/or light signals such as a blinking light) that are emitted by the one or more audio output devices. For example, an audio output device may emit (via a physical connection and/or wirelessly) electronic signals indicating that an audio output device may be paired to another device (e.g., a television that receives data indicating audio content) that is configured to send audio data to an audio output device. Further, detecting one or more audio output devices may comprise using a camera that may capture images of a space that may be processed by a machine learning model that is configured to detect one or more audio output devices within the images.

In 1010, dimensions of a space comprising and/or housing the one or more audio output devices may be determined. For example, the computing device that receives the data indicating audio content may access data that indicates the dimensions of a space in which the computing device is located. The data indicating the dimensions of the space may be based on user provided data (e.g., a user indicating the dimensions of a space via input to a user interface) and/or previously collected data indicating the dimensions of a space that was generated via one or more dimension determination operations as described herein (e.g., QR codes, echolocation, and/or image analysis).

Determining the dimensions of the space may comprise receiving the one or more locations corresponding to the one or more audio output devices based on one or more the audio output devices scanning a quick response (QR) code displayed on a web page configured to send the one or more locations corresponding to the audio output devices to the computing device. For example, a computing device may generate a QR code on a user interface displayed by the computing device. Based on an audio output device scanning the QR code, the location of the audio output device at the time the QR code was scanned may be transmitted to the computing device. The location of the audio output device that scanned the QR code and the location of the computing device that generated the QR code may be used to determine the dimensions of the space housing the one or more audio output devices.

Determining the dimensions of the space may comprise generating a plurality of sound signals. For example, a computing device may generate a plurality of beeping sounds via a speaker of the computing device. Further, determining the dimensions of the space may be based on echolocation using a plurality of sound signals. For example, a computing device may perform echolocation on the plurality of beeping sounds by analyzing how the plurality of beeping sounds are reflected by and/or absorbed by objects in the space.

A computing device may comprise a camera that is configured to capture an image of a space and determine dimensions of the space based on analysis of the image. For example, analysis of an image may be based on inputting the image into a machine learning model that is configured to recognize features and/or objects of a space and determine the dimensions of the space based on the features and/or objects recognized within the image of the space.

In 1015, one or more estimated locations corresponding to one or more viewers of content may be determined. The one or more viewers may comprise consumers of content which may comprise audio content and/or video content (e.g., the audio content and/or video content described with respect to FIG. 9). Further, the one or more viewers may comprise one or more listeners of content (e.g., individuals listening to audio content). The one or more estimated locations corresponding to the one or more viewers of content may comprise one or more estimated locations relative to the location of a device that receives data indicating audio content (e.g., a location of a viewer relative to the location of a television), a set of geographic coordinates (e.g., latitude, longitude, and/or altitude), and/or an identified location that is associated with a geographic location (e.g., an office of a house located at a particular geographic location or a couch within a living room of the house).

The one or more estimated locations corresponding to one or more viewers may be based on the one or more locations of the one or more audio output devices. Further, the one or more estimated locations corresponding to the one or more viewers may be determined to be the same as the one or more locations corresponding to the one or more audio output devices. For example, the one or more estimated locations of the one or more viewers may be determined to be the same as the one or more locations of the one or more audio output devices that were determined based on scanning a QR code, echolocation, and/or detection of ultrawideband radio signals emitted by the one or more audio output devices.

Further, the one or more estimated locations corresponding to the one or more viewers may be determined to be within some distance (e.g., one meter) of the one or more locations corresponding to the one or more audio output devices. For example, the one or more estimated locations of the one or more viewers may be determined to be within a one meter radius of the one or more locations of the one or more audio output devices that were determined based on scanning a QR code, echolocation, and/or detection of ultrawideband radio signals emitted by the one or more audio output devices.

A computing device (e.g., an audio output device) may comprise a camera that is configured to capture one or more images of the space comprising the one or more audio output devices and then determine the location of the one or more viewers based on analysis of the one or more images. For example, analysis of one or more images of the space (e.g., the space housing the one or more audio output devices) may be based on inputting the one or more images of the space into a machine learning model that is configured to detect and/or recognize one or more viewers and determine the one or more estimated locations corresponding to the one or more viewers within the one or more images of the space.

A computing device may comprise one or more microphones that may be configured to detect one or more sounds (e.g., one or more sounds emitted by one or more viewers within a space housing the one or more audio output devices). The one or more estimated locations corresponding to the one or more viewers may be determined based on analysis of the detected sounds. For example, two or more audio output devices that comprise microphones may be used to determine the one or more locations corresponding to the one or more viewers based on triangulation of the sounds (e.g., the sounds of speech or laughter) emitted by one or more viewers.

In 1020, An audio configuration may be generated. The audio configuration may be based on one or more determined locations of the one or more audio output devices, determined dimensions of the space (e.g., the space comprising the one or more audio output devices), and/or one or more estimated locations of the one or more viewers. Further, a computing device may generate an audio configuration that indicates the dimensions of a space, the location of each audio output device within the space, and/or one or more estimated locations of the one or more viewers within the space. For example, a computing device may generate audio configuration data indicating that a space is four meters long, five meters wide, and three meters tall. Further the audio configuration may indicate that a display device that receives data indicating audio content is located at a particular location within the room, that a first audio output device of two audio output devices is located at a first location within the space, and that the second audio output device is located at a second location within the space.

Further, the audio configuration may indicate that a first viewer of content is located at the third location within the space (e.g., a location that is half a meter from the first location) and that a second viewer is located at a fourth location within the space (e.g., a location that is one meter from the second location). The audio configuration may be used to generate audio data (e.g., mixed audio data) that uses the dimensions of a space, one or more locations of one or more audio output devices, and/or one or more estimated locations of one or more viewers to determine the assignment of mixed audio channels to audio output devices.

In 1025, a preferred spatial configuration for the one or more audio output devices may be determined. Determining the preferred spatial configuration may be based on the one or more locations of the one or more audio output devices, dimensions of the space housing the one or more audio output devices, one or more estimated locations of the one or more viewers, and/or audio capabilities of the one or more audio output devices (e.g., the audio capabilities determined in 910 of method 900). For example, the preferred spatial configuration may comprise one or more locations of the one or more audio output devices relative to the estimated locations of one or more viewers that may be determined to generate a surround sound effect that is more audible and has less interference than other spatial configurations. Determination of the preferred spatial configuration may comprise determining the absorption and/or reflection of sound waves by one or more objects (e.g., walls, furniture, and/or viewers) in a space housing the one or more audio output devices and/or determining the effect of the dimensions of a space on the audio outputted by the one or more audio output devices (e.g., larger spaces may result in a spatial configuration in which audio output devices are positioned in order to amplify the loudness of audio outputted by the audio output devices).

The preferred spatial configuration may comprise one or more preferred locations at which to place the one or more audio output devices. Further, the preferred spatial configuration may comprise locations of the one or more audio output devices relative to a display device and/or one or more estimated locations corresponding to one or more viewers. The preferred spatial configuration may indicate one or more preferred locations at which to place the one or more audio output devices in order to increase or decrease the loudness of the sound outputted by the one or more audio output devices. For example, one or more audio output devices may be placed closer to walls of a space so that the sound waves generated by the one or more audio output devices are reflected more than if the one or more audio output devices were further away from the walls. Further, one or more audio output devices may be placed closer to one or more viewers that are far enough away from one or more audio output devices that the loudness of audio detected at the estimated location of the viewer may be below a loudness threshold (e.g., an estimated loudness of audio at the estimated location of a viewer may be twenty decibels which may be below the loudness threshold of twenty-five decibels).

The preferred spatial configuration may comprise a minimum distance and/or maximum distance between the one or more audio output devices. A minimum distance between the one or more audio output devices may reduce interference between sounds generated by the one or more audio output devices. A maximum distance between audio output devices may reduce the gap in a stereo effect produced by the audio output devices.

In 1030, a prompt comprising instructions to place the one or more audio output devices at the one or more preferred locations may be generated. The prompt may indicate that placing an audio output devices at a preferred location may improve the quality of audio that is outputted by the one or more audio output devices. For example, a prompt may be generated on a display device (e.g., display device 112) via which content was being outputted. The prompt may indicate "PLACE YOUR SMARTPHONE FACE UP AT A LOCATION TWO FEET IN FRONT OF THE TELEVISION SCREEN." Following the generation of the prompt comprising instructions to place the one or more audio output devices at the one or more preferred locations, 925 may be performed by way of the "B" connector.

Figure 11:
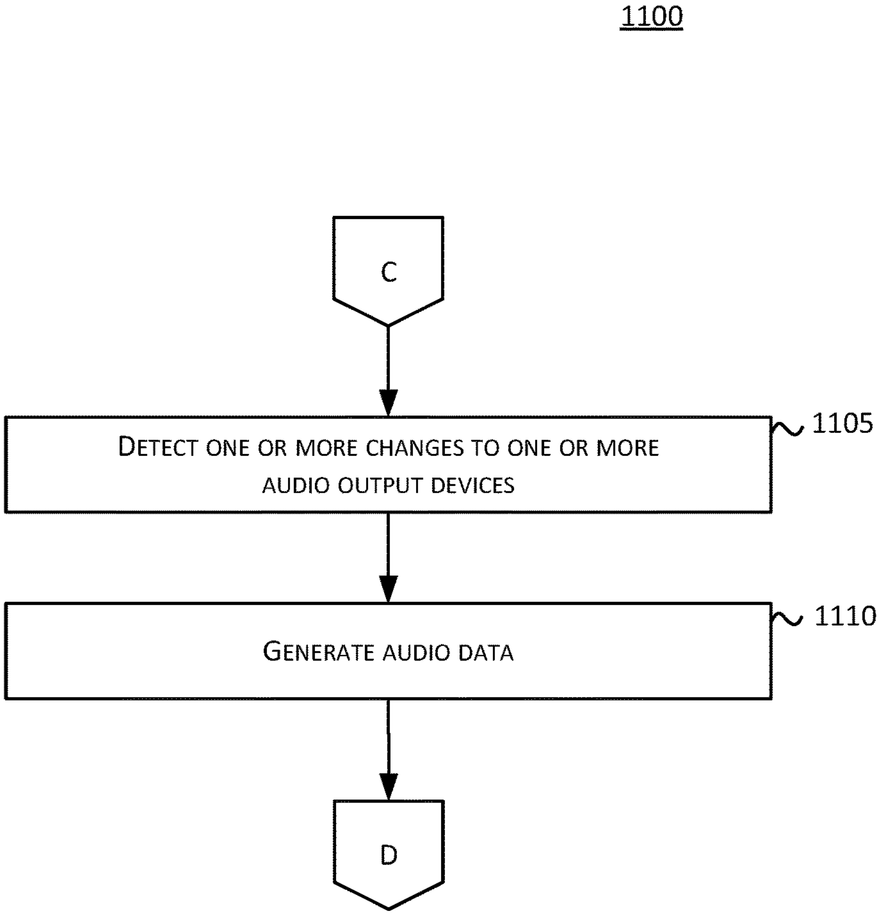
FIG. 11 is a flow chart showing the generation of mixed audio based on detected changes in the locations of audio output devices.

FIG. 11 is a flow chart showing an example method for generating mixed audio based on detected changes in the locations of audio output devices according to various aspects of the disclosure. As indicated by the "C" connector in FIG. 9, the method 1100 described with respect to FIG. 11 may be performed based on performing 935 of the method 900 that is described with respect to FIG. 9. Further, one or more of the parts of FIG. 11 may be part of the method 900 that is described with respect to FIG. 9. The method 1100 described with respect to FIG. 11 may be performed by any device described herein, including one or more mobile devices 125. One, some, or all parts of FIG. 11 may be omitted, performed in other orders, and/or otherwise modified, and/or one or more additional parts may be added.

In 1105, one or more changes to the one or more audio output devices (e.g., one or more audio output devices that may comprise one or more mobile devices) may be detected. Further, each of the one or more audio output devices may be respectively associated with one or more audio capabilities. As described in 910 of the method 900, the audio capabilities of the one or more audio output devices may comprise various hardware and/or software capabilities that determine a capability of the one or more audio output devices to receive data (e.g., data indicating audio content), process data, and/or output audio.

As described with respect to FIG. 7, the one or more changes may comprise one or more changed locations corresponding to the one or more audio output devices. As described in 915 of the method 900, the one or more locations corresponding to the one or more audio output devices may comprise a location relative to a device that receives data indicating audio content, geographic coordinates (e.g., latitude, longitude, and/or altitude), and/or an identified location (e.g., living room or kitchen) that is associated with a geographic location. Further, as described with respect to FIG. 6, the one or more changes may comprise removal of at least one of the one or more audio output devices. As described with respect to FIG. 5, the one or more changes may comprise addition of at least one additional audio output device to the one or more audio output devices.

In 1110, audio data (e.g., mixed audio data) may be generated. The audio data (e.g., mixed audio data) may comprise a plurality of mixed audio channels. Generating the audio data (e.g., mixed audio data) may be based on the one or more audio capabilities of the one or more audio output devices (e.g., generation of the audio data based on audio capabilities as described in 925 of the method 900), the one or more locations corresponding to the one or more audio output devices (e.g., generation of audio data based on one or more locations corresponding to one or more audio output devices the as described in 925 of the method 900), and/or the one or more changes to the one or more audio output devices. Further, generating the audio data (e.g., mixed audio data) may be based on the one or more locations corresponding to the one or more audio output devices as described in 915 of the method 900).

The audio data (e.g., mixed audio data) may comprise a plurality of amplitudes of the mixed audio channels. For example, the audio data (e.g., mixed audio data) may comprise three mixed audio channels (e.g., a left channel, a right channel, and a center channel) and the audio data (e.g., mixed audio data) may indicate that each mixed audio channel has the same amplitude, that the center channel has a ten percent greater amplitude than the right and left channel, or that the right and left channels have amplitudes that are less than an amplitude of the center channel. Further, As described with respect to FIGS. 5-7, generating the audio data (e.g., mixed audio data) may comprise modifying, based on the one or more changed locations corresponding to the one or more audio output devices, the plurality of amplitudes of the audio outputted to the plurality of mixed audio channels.

As described with respect to FIGS. 5-7, generating the audio data (e.g., mixed audio data) may comprise reassigning the plurality of mixed audio channels from at least one of the one or more audio output devices that was removed to at least one of the one or more audio output devices that remain.

Generating the audio data (e.g., mixed audio data) may comprise reassigning the plurality of mixed audio channels to include at least one additional audio output devices that was added. For example, if data indicating audio content comprised two original audio channels and one audio output device was added, then the computing device may mix the audio content to use three audio output devices instead of two. If the two original audio channels comprised a left audio channel and a right audio channel, the audio data (e.g., mixed audio data) may comprise a mixed left audio channel, a mixed right audio channel, and a mixed center audio channel. Further, the mixed audio channels may change the audio output devices that were assigned to the original audio channels. For example, an additional audio output device that was added to a space may be assigned to a mixed center audio channel that replaces another audio output device that was previously being used as a center audio channel. Following the generation of the audio data (e.g., mixed audio data), 930 may be performed by way of the "D" connector.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

receiving, by a computing device, data indicating audio content, wherein the audio content comprises a plurality of audio channels;

determining audio capabilities of one or more audio output devices comprising one or more mobile devices;

determining one or more locations corresponding to the one or more audio output devices;

generating, based on the data indicating the audio content, the audio capabilities, and the one or more locations that were determined for the one or more audio output devices, audio data indicating a plurality of mixed audio channels corresponding to the one or more audio output devices; and sending the audio data to the one or more audio output devices.

2. The method of claim 1, wherein the generating the audio data comprises:

determining a number of speakers in each of the one or more audio output devices; and generating the audio data based on the number of speakers in each of the one or more audio output devices.

3. The method of claim 1, wherein the generating the audio data comprises:

determining one or more positions of speakers in each of the one or more audio output devices; and generating the audio data based on the one or more positions of the speakers in each of the one or more audio output devices.

4. The method of claim 1, wherein the determining one or more locations corresponding to the one or more audio output devices comprises:

retrieving an audio configuration indicating the one or more locations corresponding to the one or more audio output devices.

5. A method comprising:

sending, to one or more audio output devices, data indicating audio content comprising a plurality of audio channels, wherein the one or more audio output devices comprise one or more mobile devices;

detecting, by a computing device, one or more changes to the one or more audio output devices, wherein each of the one or more audio output devices is respectively associated with one or more audio capabilities and one or more locations corresponding to the one or more audio output devices; and generating, based on the one or more audio capabilities of the one or more audio output devices, the one or more locations corresponding to the one or more audio output devices, and the one or more changes to the one or more audio output devices, audio data indicating a plurality of mixed audio channels.

6. The method of claim 5, wherein the one or more changes comprise removal of at least one of the one or more audio output devices, and wherein the generating the audio data comprises:

reassigning the plurality of mixed audio channels from at least one of the one or more audio output devices that was removed to at least one of the one or more audio output devices that remain.

7. The method of claim 6, further comprising adjusting a loudness of at least one of the plurality of mixed audio channels.

8. The method of claim 6, further comprising detecting the removal of the at least one of the one or more audio output devices by determining that the at least one of the one or more audio output devices is no longer connected to a network connected to the computing device.

9. The method of claim 6, further comprising detecting, by the computing device, addition of a new audio output device to the one or more audio output devices.

10. The method of claim 9, wherein detecting the addition of the new audio output device comprises determining that the new audio output device is connected to a network connected to the computing device.

11. The method of claim 9, wherein detecting the addition of the new audio output device comprises by detecting one or more signals emitted by the new audio output device.

12. The method of claim 9, further comprising reassigning the plurality of mixed audio channels based on the new audio output device.

13. The method of claim 1, further comprising:

based on detecting removal of at least one of the one or more audio output devices, reassigning the plurality of mixed audio channels from at least one of the one or more audio output devices that was removed to at least one of the one or more audio output devices that remain.

14. The method of claim 1, wherein the determining the audio capabilities of the one or more audio output devices comprises:

determining one or more media access control (MAC) addresses of the one or more audio output devices; and matching the one or more MAC addresses to one or more audio output device profiles that correlate the one or more MAC addresses to the audio capabilities of the one or more audio output devices.

15. The method of claim 1, wherein the audio capabilities of the one or more audio output devices comprise a plurality of frequency response ranges, and wherein the generating the audio data comprises:

determining the plurality of mixed audio channels corresponding to the one or more audio output devices based on the plurality of frequency response ranges of the one or more audio output devices.

16. The method of claim 1, wherein the audio capabilities of the one or more audio output devices comprise a plurality of loudness thresholds, and wherein the generating the audio data comprises:

determining the plurality of mixed audio channels corresponding to the one or more audio output devices based on the plurality of loudness thresholds of the one or more audio output devices.

17. The method of claim 1, wherein the plurality of audio channels comprise a speech channel used for spoken audio, and wherein the generating the audio data comprises:

determining the one or more audio output devices from which to output the speech channel based on matching one of a plurality of frequency response ranges of the one or more audio output devices to a frequency response range associated with the speech channel.

18. The method of claim 1, wherein the generating the audio data comprises:

retrieving an audio configuration indicating dimensions of a space comprising the one or more audio output devices.

19. The method of claim 1, wherein the one or more audio output devices comprise a display device, and wherein the plurality of mixed audio channels comprise at least one center channel that is outputted via the display device.

20. The method of claim 5, wherein the one or more changes comprise one or more changed locations corresponding to the one or more audio output devices, wherein the audio data comprises a plurality of amplitudes of the mixed audio channels, and wherein the generating the audio data comprises:

modifying, based on the one or more changed locations corresponding to the one or more audio output devices, the plurality of amplitudes of the mixed audio channels.

21. The method of claim 5, wherein the one or more changes comprise addition of at least one additional audio output device to the one or more audio output devices, and wherein the generating the audio data comprises:

reassigning the plurality of mixed audio channels to include the at least one additional audio output device that was added.

22. An apparatus comprising:

one or more processors; and memory storing instructions that, when executed by the one or more processors, cause the apparatus to:

receive data indicating audio content, wherein the audio content comprises a plurality of audio channels;

determine audio capabilities of one or more audio output devices comprising one or more mobile devices;

determine one or more locations corresponding to the one or more audio output devices;

generate, based on the data indicating the audio content, the audio capabilities, and the one or more locations that were determined for the one or more audio output devices, audio data indicating a plurality of mixed audio channels corresponding to the one or more audio output devices; and send the audio data to the one or more audio output devices.

23. The apparatus of claim 22, wherein the instructions, when executed by the one or more processors, cause the apparatus to generate the audio data by:

determining a number of speakers in each of the one or more audio output devices; and generating the audio data based on the number of speakers in each of the one or more audio output devices.

24. The apparatus of claim 22, wherein the instructions, when executed by the one or more processors, cause the apparatus to generate the audio data by:

determining one or more positions of speakers in each of the one or more audio output devices; and generating the audio data based on the one or more positions of the speakers in each of the one or more audio output devices.

25. The apparatus of claim 22, wherein the instructions, when executed by the one or more processors, cause the apparatus to determine the one or more locations corresponding to the one or more audio output devices by:

retrieving an audio configuration indicating the one or more locations corresponding to the one or more audio output devices.

26. The apparatus of claim 22, wherein the instructions, when executed by the one or more processors, cause the apparatus to:

based on detecting removal of at least one of the one or more audio output devices, reassign the plurality of mixed audio channels from at least one of the one or more audio output devices that was removed to at least one of the one or more audio output devices that remain.

27. The apparatus of claim 22, wherein the instructions, when executed by the one or more processors, cause the apparatus to determine the audio capabilities of the one or more audio output devices by:

determining one or more media access control (MAC) addresses of the one or more audio output devices; and matching the one or more MAC addresses to one or more audio output device profiles that correlate the one or more MAC addresses to the audio capabilities of the one or more audio output devices.

28. The apparatus of claim 22, wherein the audio capabilities of the one or more audio output devices comprise a plurality of frequency response ranges, and wherein the instructions, when executed by the one or more processors, cause the apparatus to generate the audio data by:

determining the plurality of mixed audio channels corresponding to the one or more audio output devices based on the plurality of frequency response ranges of the one or more audio output devices.

29. The apparatus of claim 22, wherein the audio capabilities of the one or more audio output devices comprise a plurality of loudness thresholds, and wherein the instructions, when executed by the one or more processors, cause the apparatus to generate the audio data by:

determining the plurality of mixed audio channels corresponding to the one or more audio output devices based on the plurality of loudness thresholds of the one or more audio output devices.

30. The apparatus of claim 22, wherein the plurality of audio channels comprise a speech channel used for spoken audio, and wherein the instructions, when executed by the one or more processors, cause the apparatus to generate the audio data by:

determining the one or more audio output devices from which to output the speech channel based on matching one of a plurality of frequency response ranges of the one or more audio output devices to a frequency response range associated with the speech channel.

31. The apparatus of claim 22, wherein the instructions, when executed by the one or more processors, cause the apparatus to generate the audio data by:

retrieving an audio configuration indicating dimensions of a space comprising the one or more audio output devices.

32. The apparatus of claim 22, wherein the one or more audio output devices comprise a display device, and wherein the plurality of mixed audio channels comprise at least one center channel that is outputted via the display device.

33. One or more non-transitory computer readable medium storing instructions that, when executed, cause:

receiving, by a computing device, data indicating audio content, wherein the audio content comprises a plurality of audio channels;

determining audio capabilities of one or more audio output devices comprising one or more mobile devices;

determining one or more locations corresponding to the one or more audio output devices;

generating, based on the data indicating the audio content, the audio capabilities, and the one or more locations that were determined for the one or more audio output devices, audio data indicating a plurality of mixed audio channels corresponding to the one or more audio output devices; and sending the audio data to the one or more audio output devices.

34. The one or more non-transitory computer readable medium of claim 33, wherein the instructions, when executed, cause generating the audio data by causing:

determining a number of speakers in each of the one or more audio output devices; and generating the audio data based on the number of speakers in each of the one or more audio output devices.

35. The one or more non-transitory computer readable medium of claim 33, wherein the instructions, when executed, cause generating the audio data by causing:

determining one or more positions of speakers in each of the one or more audio output devices; and generating the audio data based on the one or more positions of the speakers in each of the one or more audio output devices.

36. The one or more non-transitory computer readable medium of claim 33, wherein the instructions, when executed, cause determining the one or more locations corresponding to the one or more audio output devices by:

retrieving an audio configuration indicating the one or more locations corresponding to the one or more audio output devices.

37. The one or more non-transitory computer readable medium of claim 33, wherein the instructions, when executed, further cause:

based on detecting removal of at least one of the one or more audio output devices, reassigning the plurality of mixed audio channels from at least one of the one or more audio output devices that was removed to at least one of the one or more audio output devices that remain.

38. The one or more non-transitory computer readable medium of claim 33, wherein the instructions, when executed, further cause determining the audio capabilities of the one or more audio output devices by:

determining one or more media access control (MAC) addresses of the one or more audio output devices; and matching the one or more MAC addresses to one or more audio output device profiles that correlate the one or more MAC addresses to the audio capabilities of the one or more audio output devices.

39. The one or more non-transitory computer readable medium of claim 33, wherein the audio capabilities of the one or more audio output devices comprise a plurality of frequency response ranges, and wherein the instructions, when executed, cause generating the audio data by:

determining the plurality of mixed audio channels corresponding to the one or more audio output devices based on the plurality of frequency response ranges of the one or more audio output devices.

40. The one or more non-transitory computer readable medium of claim 33, wherein the audio capabilities of the one or more audio output devices comprise a plurality of loudness thresholds, and wherein the instructions, when executed, cause generating the audio data by:

determining the plurality of mixed audio channels corresponding to the one or more audio output devices based on the plurality of loudness thresholds of the one or more audio output devices.

41. The one or more non-transitory computer readable medium of claim 33, wherein the plurality of audio channels comprise a speech channel used for spoken audio, and wherein the instructions, when executed, cause generating the audio data by:

determining the one or more audio output devices from which to output the speech channel based on matching one of a plurality of frequency response ranges of the one or more audio output devices to a frequency response range associated with the speech channel.

42. The one or more non-transitory computer readable medium of claim 33, wherein the instructions, when executed, cause generating the audio data by:

retrieving an audio configuration indicating dimensions of a space comprising the one or more audio output devices.

43. The one or more non-transitory computer readable medium of claim 33, wherein the one or more audio output devices comprise a display device, and wherein the plurality of mixed audio channels comprise at least one center channel that is outputted via the display device.

44. A system comprising:

one or more audio output devices; and a computing device comprising:

one or more processors; and memory storing instructions that, when executed by the one or more processors, cause the computing device to:

receive data indicating audio content, wherein the audio content comprises a plurality of audio channels;

determine audio capabilities of the one or more audio output devices comprising one or more mobile devices;

determine one or more locations corresponding to the one or more audio output devices;

generate, based on the data indicating the audio content, the audio capabilities, and the one or more locations that were determined for the one or more audio output devices, audio data indicating a plurality of mixed audio channels corresponding to the one or more audio output devices; and send the audio data to the one or more audio output devices.

45. The system of claim 44, wherein the instructions, when executed by the one or more processors, cause the computing device to generate the audio data by:

determining a number of speakers in each of the one or more audio output devices; and generating the audio data based on the number of speakers in each of the one or more audio output devices.

46. The system of claim 44, wherein the instructions, when executed by the one or more processors, cause the computing device to generate the audio data by:

determining one or more positions of speakers in each of the one or more audio output devices; and generating the audio data based on the one or more positions of the speakers in each of the one or more audio output devices.

47. The system of claim 44, wherein the instructions, when executed by the one or more processors, cause the computing device to determine the one or more locations corresponding to the one or more audio output devices by:

retrieving an audio configuration indicating the one or more locations corresponding to the one or more audio output devices.

48. The system of claim 44, wherein the instructions, when executed by the one or more processors, cause the computing device to:

based on detecting removal of at least one of the one or more audio output devices, reassign the plurality of mixed audio channels from at least one of the one or more audio output devices that was removed to at least one of the one or more audio output devices that remain.

49. The system of claim 44, wherein the instructions, when executed by the one or more processors, cause the computing device to determine the audio capabilities of the one or more audio output devices by:

determining one or more media access control (MAC) addresses of the one or more audio output devices; and matching the one or more MAC addresses to one or more audio output device profiles that correlate the one or more MAC addresses to the audio capabilities of the one or more audio output devices.

50. The system of claim 44, wherein the audio capabilities of the one or more audio output devices comprise a plurality of frequency response ranges, and wherein the instructions, when executed by the one or more processors, cause the computing device to generate the audio data by:

determining the plurality of mixed audio channels corresponding to the one or more audio output devices based on the plurality of frequency response ranges of the one or more audio output devices.

51. The system of claim 44, wherein the audio capabilities of the one or more audio output devices comprise a plurality of loudness thresholds, and wherein the instructions, when executed by the one or more processors, cause the computing device to generate the audio data by:

determining the plurality of mixed audio channels corresponding to the one or more audio output devices based on the plurality of loudness thresholds of the one or more audio output devices.

52. The system of claim 44, wherein the plurality of audio channels comprise a speech channel used for spoken audio, and wherein the instructions, when executed by the one or more processors, cause the computing device to generate the audio data by:

determining the one or more audio output devices from which to output the speech channel based on matching one of a plurality of frequency response ranges of the one or more audio output devices to a frequency response range associated with the speech channel.

53. The system of claim 44, wherein the instructions, when executed by the one or more processors, cause the computing device to generate the audio data by:

retrieving an audio configuration indicating dimensions of a space comprising the one or more audio output devices.

54. The system of claim 44, wherein the one or more audio output devices comprise a display device, and wherein the plurality of mixed audio channels comprise at least one center channel that is outputted via the display device.

* * * * *